US010746965B2

(12) United States Patent
Arita

(10) Patent No.: US 10,746,965 B2
(45) Date of Patent: Aug. 18, 2020

(54) IMAGING LENS AND IMAGING APPARATUS

(71) Applicant: Nanchang O-FILM Optical-Electronic Tech CO., LTD, Jiangzi (CN)

(72) Inventor: Shinichi Arita, Tokyo (JP)

(73) Assignee: NANCHANG O-FILM OPTICAL-ELECTRONIC TECH CO., LTD, Nanchang (CN)

(*) Notice: Subject to any disclaimer, the term of this patent is extended or adjusted under 35 U.S.C. 154(b) by 94 days.

(21) Appl. No.: 16/037,129

(22) Filed: Jul. 17, 2018

(65) Prior Publication Data

US 2019/0064485 A1    Feb. 28, 2019

(30) Foreign Application Priority Data

Aug. 31, 2017   (JP) .................... 2017-167905

(51) Int. Cl.
*G02B 3/02*      (2006.01)
*G02B 13/00*     (2006.01)
(Continued)

(52) U.S. Cl.
CPC ........... *G02B 13/0045* (2013.01); *G02B 9/62* (2013.01); *G02B 13/0085* (2013.01); *G02B 13/04* (2013.01); *G02B 13/14* (2013.01)

(58) Field of Classification Search
CPC .................................................. G02B 13/0045
(Continued)

(56) References Cited

U.S. PATENT DOCUMENTS

2012/0243108 A1   9/2012 Tsai et al.
2014/0098239 A1*  4/2014 Jeong .................. G02B 9/62
                                              348/164
(Continued)

FOREIGN PATENT DOCUMENTS

JP    2013-182090 A    9/2013
TW    201641987 A     12/2016

OTHER PUBLICATIONS

European Search Report and Opinion dated Jan. 10, 2019 issued on European Patent Application EP18176034 in the name of Nanchang O-Film Optical-Electronic Tech Co., Ltd, nine (9) pages.
(Continued)

*Primary Examiner* — James C. Jones
(74) *Attorney, Agent, or Firm* — Franklin & Associates International Inc; Matthew Lambrinos

(57) ABSTRACT

An imaging lens includes: a first lens having a convex surface facing the object side, and having a positive refractive power; a second lens being a meniscus lens having a negative refractive power; a third lens having a concave surface facing the imaging side; a fourth lens being a meniscus lens having a positive refractive power, having a convex surface facing the image side; a fifth lens having a negative refractive power, having a concave surface facing the image side on an optical axis, the surface facing the image side having an inflection point outside the optical axis; a sixth lens having a rear surface facing the image side and a front surface facing the object side, the rear surface being aspherical with a inflection point outside an optical axis, the front surface having a curvature less than other lenses' curvatures, the sixth lens serving as an infrared cut-off filter.

7 Claims, 13 Drawing Sheets

(51) Int. Cl.
G02B 13/14 (2006.01)
G02B 9/62 (2006.01)
G02B 13/04 (2006.01)

(58) Field of Classification Search
USPC .......................................................... 359/713
See application file for complete search history.

(56) References Cited

U.S. PATENT DOCUMENTS

| | | |
|---|---|---|
| 2015/0124333 A1 | 5/2015 | Noda et al. |
| 2016/0231537 A1 | 8/2016 | Kubota et al. |
| 2016/0282587 A1 | 9/2016 | Hashimoto |
| 2017/0059828 A1 | 3/2017 | Sekine et al. |
| 2017/0235111 A1* | 8/2017 | Hashimoto ........ G02B 13/0045 359/713 |
| 2019/0049699 A1 | 2/2019 | Tabata |
| 2019/0265440 A1 | 8/2019 | Tabata |

OTHER PUBLICATIONS

Herbert Gross, "Handbook of Optical Systems, vol. 3: Aberration Theory and Correction of Optical Systems", Handbook of Optical Systems, vol. 3, Wiley-VSH, six (6) pages.
Taiwanese Office Action dated Sep. 18, 2018 in the corresponding counterpart patent application No. 107121949.

* cited by examiner

IMAGING LENS AND IMAGING APPARATUS

CROSS-REFERENCE TO RELATED APPLICATIONS

This application claims the benefit of Japan Patent Application No. 2017-167905, filed Aug. 31, 2017, the entire content of which is incorporated by reference herein in its entirety.

TECHNICAL FIELD

The present disclosure relates to an imaging lens and an imaging apparatus.

BACKGROUND

Since the thickness of the mobile information terminal such as a smartphone is reduced, or a camera mounted on the mobile information terminal is getting higher pixels, an imaging lens of the camera is required to be thin and large-caliber.

For example, Patent Document 1 disclosed an imaging system composed of five lenses, so as to reduce the thickness, to achieve a brightness under F2.5 and a wide angle, and to correct aberrations.

Additionally, Patent Document 2 disclosed an imaging system composed of six lenses, so as to correct the aberrations and to get high resolution while achieving a wide angle with a full field angle larger than 80°.

Patent Document 1: Japan Patent Publication No. 2016-018001.

Patent Document 2: Japan Patent Publication No. 2015-007748.

However, a large-caliber imaging lens needs to achieve a brightness under F2.2, or further under F2.0. As a result, the imaging lenses disclosed in Patent Document 1 and Patent Document 2 are not sufficiently thin.

SUMMARY

According to various embodiments of present disclosure, an imaging lens is provided.

The imaging lens includes, in order from an object side toward an image side: a first lens having a convex surface facing the object side, and the first lens having a positive refractive power; a second lens being a meniscus lens having a negative refractive power; a third lens having a concave surface facing the imaging side, and two surfaces thereof being aspherical; a fourth lens being a meniscus lens having a positive refractive power, the fourth lens having a convex surface facing the image side; a fifth lens having a negative refractive power, the fifth lens having a concave surface facing the image side on an optical axis, the surface facing the image side having an inflection point outside the optical axis, and two surfaces thereof being aspherical; a sixth lens having a rear surface facing the image side and a front surface facing the object side, the rear surface being with a inflection point outside an optical axis, the front surface having a curvature less than any curvatures of the other lenses, and the sixth lens serving as an infrared cut-off filter. The imaging lens satisfies the following conditions (1) and (2):

$$TTL/2ih < 0.8 \quad (1)$$

$$0.75 < ih/f < 0.9 \quad (2)$$

TTL is a distance on the optical axis from the surface of the first lens facing the object side toward an image surface, ih is a maximal image height, and f is a focal length of the overall imaging lens system.

An imaging apparatus includes, an imaging lens; and an imaging element configured to convert an optical image obtained from the imaging lens to an electric signal. The imaging lens includes, in order from an object side toward an image side: a first lens having a convex surface facing the object side, and the first lens having a positive refractive power; a second lens being a meniscus lens having a negative refractive power; a third lens having a concave surface facing the imaging side, and two surfaces thereof being aspherical; a fourth lens being a meniscus lens having a positive refractive power, the fourth lens having a convex surface facing the image side; a fifth lens having a negative refractive power, the fifth lens having a concave surface facing the image side on an optical axis, the surface facing the image side having an inflection point outside the optical axis, and two surfaces thereof being aspherical; a sixth lens having a rear surface facing the image side and a front surface facing the object side, the rear surface being aspherical with a inflection point outside an optical axis, the front surface having a curvature less than any curvatures of the other lenses, and the sixth lens serving as an infrared cut-off filter. The imaging lens satisfies the following conditions (1) and (2):

$$TTL/2ih < 0.8 \quad (1)$$

$$0.75 < ih/f < 0.9 \quad (2)$$

TTL is a distance on the optical axis from the surface of the first lens facing the object side toward an image surface, ih is a maximal image height, and f is a focal length of an overall imaging lens system.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Figure 1:
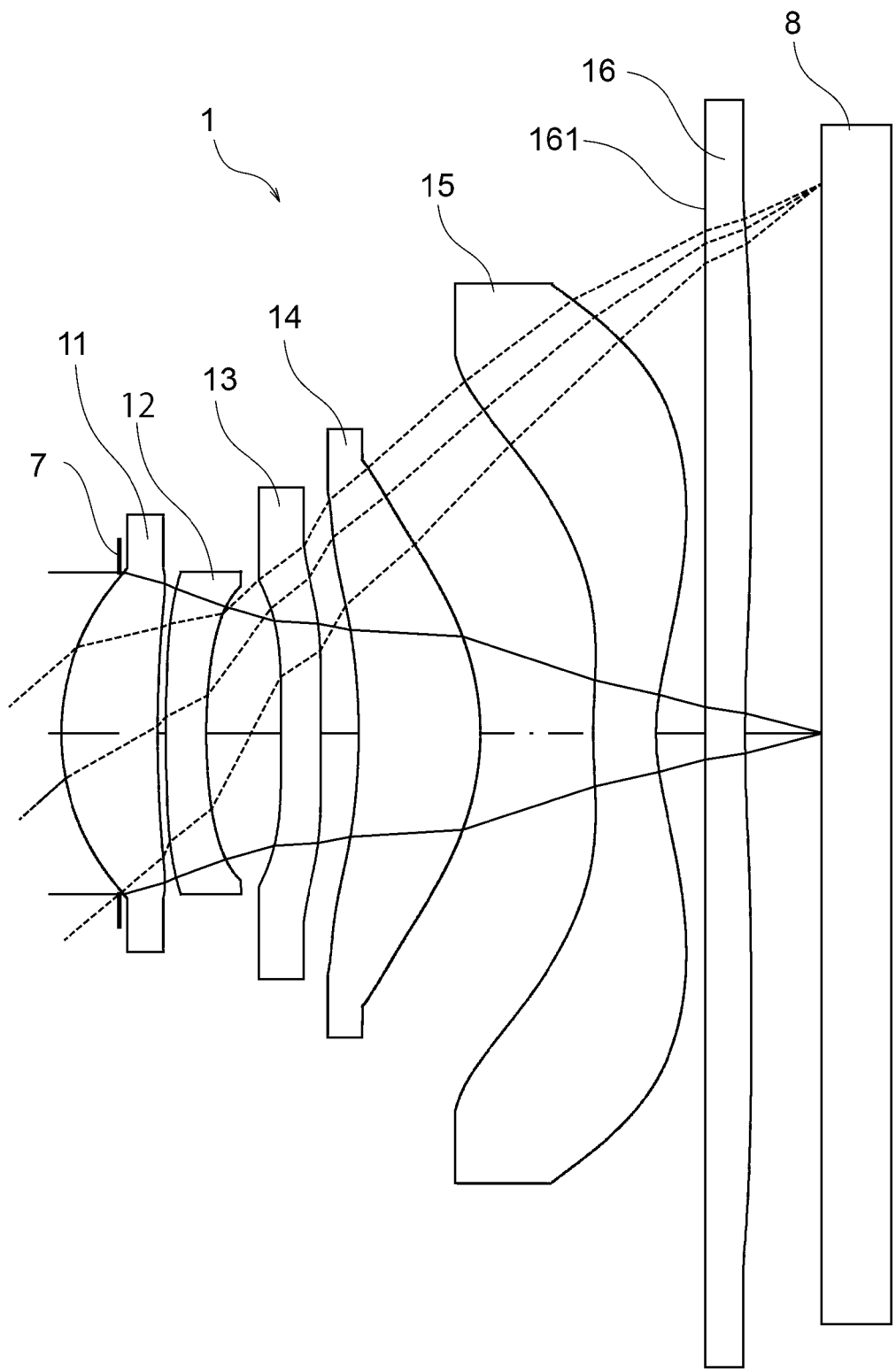
FIG. 1 is a schematic diagram of an imaging optical system according to a first embodiment.

Hereinafter, embodiments according to present disclosure will be described.

Structure of the Imaging Lens

An imaging lens according to an embodiment includes, in order from an object side toward an image side: a first lens having a convex surface facing the object side, and the first lens having a positive refractive power; a second lens being a meniscus lens having a negative refractive power; a third lens having a concave surface facing the imaging side, and two surfaces thereof being aspherical; a fourth lens being a meniscus lens having a positive refractive power, the fourth lens having a convex surface facing the image side; a fifth lens having a negative refractive power, the fifth lens having a concave surface facing the image side on an optical axis, the surface facing the image surface having an inflection point outside the optical axis, and two surfaces thereof being aspherical; a sixth lens having a rear surface facing the image side and a front surface facing the object side, the rear surface being aspherical with a inflection point outside an optical axis, the front surface having a curvature less than any curvatures of the other lenses, and the sixth lens serving as an infrared cut-off filter.

In other words, the imaging lens according to an embodiment has a structure composed of six lenses of positive, negative, positive/negative, positive, negative, positive/negative. The second lens and the fourth lens are meniscus lenses, the third lens and the fifth lens are lenses with two aspherical surfaces, and the fifth lens and the sixth lens are aspherical lenses with inflection points.

Additionally, the sixth lens according to an embodiment also serves as the infrared cut-off filter. A conventional imaging apparatus is equipped with an infrared cut-off filter between an imaging lens and an image surface. Therefore, the conventional imaging lens requires a long focal length, which prevents the imaging lens from being thinner. On the contrary, the imaging lens according to an embodiment is designed with a shorter back focal length, therefore the thickness is reduced.

Additionally, the light transmittance of the sixth length is a half (50%) for any wavelength from 380 nm to 430 nm, the light transmittance for wavelength from 500 nm to 600 nm is 80% or more, and the light transmittance for wavelength from 730 nm to 800 nm is 10% or less.

Additionally, the curvature of the front surface of the sixth lens is less than any curvatures of the other lenses. Typically, the front surface can have a shape of plane. When the front surface of the sixth lens has a low curvature, the task of correcting residual image surface curvature and the distortion aberration from the first lens to the fifth lens, and the task of correcting a chief ray angle (CRA) of sensor can be completed on the rear surface of the sixth lens, which is the last surface of the imaging lens.

When a distance between a correcting surface configured to correct the image surface curvature and the distortion aberration and the image surface is relatively long, (for example, assuming the correcting surface is the front surface of the sixth length and the rear surface is a surface with low curvature), an area of light transmitting the correcting surface becomes larger. In this case, the correcting surface of the sixth lens has an increased correction effect on the image surface curvature and the distortion aberration. Additionally, in order to avoid the generation of the coma aberration, the tolerance of the shape accuracy to be attained by the aspherical shape of the correcting surface becomes very strict. However, as previously described, the imaging lens according to an embodiment can be designed with a shorter back focal length, therefore the tolerance of the shape accuracy can be loosen via using the sixth lens to correct the image surface curvature and the distortion aberration.

Additionally, to correct CRA, an angle of the light from a rear surface of the fifth lens is corrected at the correcting surface. When the distance between the correcting surface and the image surface is relatively long, (for example, assuming the correcting surface is the front surface of the sixth length and the rear surface is a surface with low curvature), a larger and positive amount of distortion aberration is required to be generated on the first lens to the fifth lens. Therefore, the aspherical amount of the first lens to the fifth lens, especially of the aspherical surfaces facing the object side increases exponentially, which makes it difficult to manufacture the first lens to fifth lens. However, as previously described, the imaging lens according to an embodiment can be designed with a shorter back focal length, therefore the correction of CRA can be achieved.

Furthermore, the function of the sixth lens serving as the infrared cut-off filter can be achieved by a filter layer provided by vapor deposition or dye spin coating of a metal multilayer film. In order to make the layer uniform, the filter layer is provided on a surface with a low curvature. When the filter layer is provided on the surface with a low curvature, it is still impossible to avoid a nonuniform caused by paint detachment, incomplete coating or smear (partial overcoating), and the like. Assuming that the front surface of the sixth lens is an aberration correcting surface with an aspherical shape, the rear surface of the sixth lens is a surface with low curvature functioning as the infrared cut-off filter, then the distance between the filter layer and the image surface is shorter. Therefore, a ratio of "defect area/ beam passing area" which is an evaluation index of defects such as black spots becomes longer, and which is not realistic as a manufacturing specification. However, as aforementioned, since the imaging lens according to an embodiment has the sixth lens having a front surface with low curvature, and having a rear surface serving as a correcting surface, then the distance between the filter layer and the image surface is longer, the ratio of "defect area/ beam passing area" is less.

Additionally, the imaging lens according to an embodiment satisfies the following conditions (1) and (2):

$$TTL/2ih < 0.8 \qquad (1)$$

$$0.75 < ih/f < 0.9 \qquad (2)$$

TTL is a distance on the optical axis from the surface of the first lens facing the object side toward an image surface, ih is a maximal image height, and f is a focal length of the overall imaging lens system.

The condition (1) determines a ratio of a distance on the optical axis from the surface facing the object side to the image surface over the maximal image height. In an imaging lens, the distance on the optical axis from the surface facing the object side of the first lens to the image surface is generally refereed as a total track length (TTL).

When the imaging lens doesn't satisfy the condition (1), either the maximal image height is too small, or TTL is too long. When the maximal image height is too small, the field angle of the imaging lens is inadequate, the function of being a wide angle lens is impaired. Otherwise, when TTL is too long, the imaging lens cannot meet the requirement of reduced thickness.

The condition (2) determines a ratio of the maximal image height over a focal length of the overall imaging lens system (hereinafter referred as "overall system focal length").

When the value of the imaging lens is lower than the lower limit of condition (2), either the overall system focal length is too long, or the maximal image height is too small. When the overall system focal length is too long, the field angle can be inadequate or TTL can be too long, thus the imaging lens doesn't have enough large caliber and slight thickness. Additionally, when the maximal image height is too small, as aforementioned, the imaging lens doesn't have enough large caliber.

Otherwise, when the value of the imaging lens is higher than the higher limit of the condition (2), either the overall system focal length is too short, or the maximal image height is too large, thus the imaging lens may not achieve the high performance in aberration and imaging performance.

Therefore, via satisfying the conditions (1) and (2), an imaging lens with reduced thickness and large caliber, and a high performance in aberration and imaging performance can be provided.

According to an embodiment, the sixth lens of the imaging lens can be a lens serves as the infrared cut-off filter due to the material thereof, otherwise, is provided with an infrared cut-off layer arranged on the front surface.

When the sixth lens serves as the infrared cut-off filter due to the material thereof, the uniformity of the infrared cut-off function on a direction perpendicular to the optical axis is higher than the uniformity of the infrared cut-off layer. Therefore, compared to serving as the infrared cut-off filter due to the infrared cut-off layer only, the uniformity of the infrared cut-off function on a direction perpendicular to the optical axis is increased when total or partial function of the infrared cut-off filter is shared by the material of the lens.

For example, a blue glass can be a material serving as an infrared cut-off filter. In this case, to rationalize the spectral transmittance with respective to the camera system, an infrared cut-off layer can be formed on the front surface of the sixth lens via metal vapor deposition.

On the other hand, when the sixth lens is provided with the infrared cut-off layer, the lens is easier to manufacture and the freedom of the selection of the infrared cut-off layer is higher. For example, an infrared cut-off layer can be a dye layer applied by spin coating, or a dye film layer formed by vacuum deposition.

Additionally, in the previously described imaging lens the sixth lens is a compound lens constituted by a substrate portion located on the object side and an aspherical lens located on the image side. When the sixth lens is the compound lens, the substrate portion and the aspherical lens can share the function of serving as the infrared cut-off filter; and share the function of correcting optical system to achieve a the high performance in aberration and imaging performance.

The imaging lens according to an embodiment satisfies the following conditions (3) and (4):

$$0.9 < f/f12345 < 1.1 \quad (3)$$

$$-0.5 \le f/f6 \le 0.3 \quad (4)$$

f is the focal length of the overall imaging lens system, f12345 is a combined focal length of the first lens, the second lens, the third lens, the fourth lens, and the fifth lens, and f6 is the focal length of the sixth length.

The condition (3) determines a ratio of the focal length of the overall imaging lens system over the focal length of the combined optical system of the lenses from the first lens to the fifth lens. When the value of condition (3) is approaching 1, the sixth lens will not affect the spherical and coma aberration, therefore the image surface curvature, the distortion aberration, and the CRA at a higher image height can be effectively corrected via the aspherical surface of the sixth lens.

When the value of condition (3) is lower than the lower limit, the positive refractive power of the sixth lens is too great, therefore, while correcting the image surface curvature, the correction will be counteracted with the corrections of distortion aberration and CRA, which makes it difficult to achieve an ideal correction.

When the value of condition (3) is higher than the higher limit, the negative refractive power of the sixth lens is too great, therefore the correction of the spherical aberration is inadequate, and the overall performance of the imaging lens is deteriorated.

The condition (4) determines a ratio of the focal length of the overall imaging lens system over the focal length of the sixth lens. The condition (4) takes the sixth lens as the reference, so as to ensure the performance of the optical system consisted of lenses from the first lens to the fifth lens. When the value of the condition (4) is 0, the design of the lens group composed of the front five lenses is equivalent to an optical system composed of five lenses, and the sixth lens can effectively correct the residual image surface curvature and distortion aberration from the front lens group.

When the value of the condition (4) is lower than the lower limit, the refractive power of the optical system composed of the front five lenses is too great, so that the sensitivity in manufacturing is deteriorated.

When the value of the condition (4) is higher than the higher limit, the refractive power of the optical system composed of the front five lenses is too small, thus the total length of lenses is enlarged.

Numerical Embodiments of the Imaging Lens

Numeral embodiments of the imaging lens according to specific embodiments with specific values applied will be described with reference to the accompanying drawings and tables.

In addition, the meanings of symbols in following tables and specification are shown, as follows.

Sn is a number of surface of each surface of imaging lens in order from the object side to the image side, R is a radius of curvature of each surface, D is a distance at the optical axis between a surface and the next surface thereof (a central thickness of a lens or a distance of gap). Nd is a refractive power of lens of each surface with respective to d-line (wavelength=587.6 nm). vd is an Abbe number of the lens of each surface with respective to d-line. For the "radius of curvature R", ∞ means that the surface is a plane. For optical elements, L1, L2 , . . . , L6 represents the firth lens, the second lens , . . . , the sixth lens, respectively.

K represents a conic constant, and A3, A4, A5 , . . . , A12 represents aspheric coefficients of corresponding degrees, respectively.

In addition, in the following table showing conic constants and aspherical coefficients, the values are represented in an exponential expression with a base of 10. For example, 0.12E−05 means $0.12 \times 10^{-5}$, and 9.87E+03 means $9.87 \times 10^3$.

According to the imaging lenses according to each embodiments, the imaging lenses have lenses with aspherical surfaces. Regarding a central point (a vertex of lens) as an origin, z is a distance parallel to the optical axis, and r is a distance perpendicular to the optical axis. In addition, c is the paraxial curvature at the vertex of lens, and k is the conic constant, and the aspherical coefficient of the third degree, fourth degree, fifth degree , . . . , twelfth degree are A3, A4, A5 . . . , A12, therefore the aspherical shape is determined by the following expression 1.

$$z = \frac{cr^2}{1 + SQRT\{1 - (1+k)c^2r^2\}} + A3r^3 + A4r^4 + A5r^5 \ldots \ldots + A12r^{12} \quad \text{Expression 1}$$

The First Embodiment

FIG. 1 is a schematic diagram of an imaging optical 1 according to a first embodiment.

The imaging lens 1 according to the first embodiment includes, in order from the object side to the image side: a first lens 11 having a positive refractive power; a second lens 12 having a negative refractive power; a third lens 13 having a negative refractive power; a fourth lens 14 having a positive refractive power, a fifth lens 15 having a negative refractive power at the center of the lens and having an inflection point outside the optical axis, and a sixth lens 16 having a negative refractive power and having an inflection point outside the optical axis. In the specification of each embodiments, the "front surface" is referred to the surface of each lens facing the object side (left side of figures), and the "rear surface" is referred to the surface of each lens facing the image side (right side of figures).

At the object side, the first lens 11 is provided with an aperture 7 with a fixed opening, and an imaging surface of an imaging element (image sensor) 8 is arranged at the imaging surface of the imaging lens 1.

The sixth lens 16 according to the first embodiment is a plastic lens, and the front surface of the sixth lens 16 is a plane. Additionally, a dye infrared-cut filter layer 161 is formed on the front surface of the sixth lens 16 via spin coating.

The data of lenses of the imaging lens 1 according to the first embodiment are shown in TABLE 1.

TABLE 1

| optical element | Sn | R | D | nd | vd |
|---|---|---|---|---|---|
| aperture | 1 | ∞ | −0.314 | 1.00000 | 0.0 |
| L1 | 2 | 1.257 | 0.524 | 1.54392 | 55.9 |
|  | 3 | 7.280 | 0.045 | 1.00000 | 0.0 |
| L2 | 4 | 11.757 | 0.220 | 1.66120 | 20.3 |
|  | 5 | 3.150 | 0.405 | 1.00000 | 0.0 |
| L3 | 6 | 153.776 | 0.216 | 1.66120 | 20.3 |
|  | 7 | 16.598 | 0.204 | 1.00000 | 0.0 |
| L4 | 8 | −3.851 | 0.661 | 1.54392 | 55.9 |
|  | 9 | −1.478 | 0.614 | 1.00000 | 0.0 |
| L5 | 10 | 3.532 | 0.340 | 1.53463 | 56.3 |
|  | 11 | 1.217 | 0.268 | 1.00000 | 0.0 |
| L6 | 12 | ∞ | 0.217 | 1.61500 | 25.9 |
|  | 13 | 10.740 | 0.414 | 1.00000 | 0.0 |

In the imaging lens 1, the twelve surfaces (from the second surface to the thirteenth lens) of lenses from the first lens 11 to the sixth lens 16 are aspherical surfaces, except for the front surface (the twelfth surface) of the sixth lens 16, which is a plane.

The aspheric coefficients and conic constant k of the aspherical surfaces according to the first embodiment are shown in TABLE 2 and TABLE 3.

TABLE 2

| Sn | K | A3 | A4 | A5 | A6 |
|---|---|---|---|---|---|
| 2 | 0.0000E+00 | −3.9202E−02 | 4.5880E−01 | −2.7353E+00 | 9.2086E+00 |
| 3 | 0.0000E+00 | −2.4480E−02 | 2.6192E−01 | −1.3632E+00 | 3.6763E+00 |
| 4 | 0.0000E+00 | 2.1318E−02 | −1.0476E−01 | 4.9536E−01 | −9.0262E−01 |
| 5 | 0.0000E+00 | −1.0884E−02 | 1.4223E−01 | −1.6030E−01 | 1.1282E+00 |
| 6 | 0.0000E+00 | −1.5381E−02 | −7.5181E−02 | −1.0609E+00 | 1.1546E+00 |
| 7 | 0.0000E+00 | 2.5347E−02 | −4.6506E−01 | 1.0718E+00 | −1.5471E+00 |
| 8 | 0.0000E+00 | −8.6533E−02 | 6.8766E−01 | −2.3897E+00 | 3.8498E−01 |
| 9 | −2.9317E−01 | −1.3395E−01 | 8.5121E−01 | −3.1999E+00 | 6.9470E+00 |
| 10 | 0.0000E+00 | 2.5232E−01 | −2.0709+00 | 4.0471E+00 | −5.0261E+00 |
| 11 | −1.2305E+01 | 1.4520E−01 | −3.9267E−01 | 1.4260E−01 | 2.7873E−01 |
| 13 | 0.0000E+00 | 1.0302E−01 | −3.0681E−01 | 3.7628E−01 | −3.7368E−01 |

TABLE 3

| Sn | A7 | A8 | A9 | A10 | A11 | A12 |
|---|---|---|---|---|---|---|
| 2 | −1.5948E+01 | 5.8685E+00 | 2.9689E+01 | −5.8856E+01 | 4.6171E+01 | −1.3905E+01 |
| 3 | −5.2643E+00 | 3.2002E+00 | 7.1903E−01 | −3.6984E−01 | −2.4965E+00 | 1.5628E+00 |
| 4 | −7.0328E−01 | 1.1062E+01 | −3.2445E+01 | 4.8400E+01 | −3.7536E+01 | 1.1855E+01 |
| 5 | −9.7366E+00 | 4.6853E+01 | −1.0245E+02 | 1.7401E+02 | −1.3388E+02 | 4.3149E+01 |
| 6 | 1.2385E+01 | −6.4397E+01 | 1.4540E+02 | −1.7888E+02 | 1.1736E+02 | −3.2183E+01 |
| 7 | −3.8433E+00 | 2.1667E+01 | −4.3803E+01 | 4.6710E+01 | −2.5455E+01 | 5.5169E+00 |
| 8 | 1.9631E+01 | −6.0861E+01 | 8.8737E+01 | −7.0142E+01 | 2.8930E+01 | −4.8905E+00 |

TABLE 3-continued

| Sn | A7 | A8 | A9 | A10 | A11 | A12 |
|----|----|----|----|-----|-----|-----|
| 9  | −8.5534E+00 | 5.6200E+00 | −1.4500E+00 | −2.2447E−01 | 1.5268E−01 | −8.6121E−03 |
| 10 | 4.1228E+00 | −2.0900E+00 | 5.8400E−01 | −6.8140E−02 | 0.0000E+00 | 0.0000E+00 |
| 11 | −3.8809E−01 | 2.1841E−01 | −6.0789E−02 | 6.8437E−03 | 0.0000E+00 | 0.0000E+00 |
| 13 | 3.1171E−01 | −1.7808E−01 | 6.0581E−02 | −1.0720E−02 | 6.6033E−04 | 2.4324E−05 |

TABLE 4 shows the focal length f of the overall system, the F-value, the full field angle, the maximal image height, total track length (TTL), the combined focal length f12345 of the lenses from the first lens 11 to the fifth lens 15, and the focal length f6 of the sixth lens 16 according to the illustrated embodiment.

TABLE 4

| f(mm) | 3.58 |
|-------|------|
| F-value | 2.08 |
| full field angle(°) | 78.8 |
| maximal image height(mm) | 2.934 |
| TTL(mm) | 4.129 |
| f12345(mm) | 3.49 |
| f6(mm) | −17.46 |

According to TABLE 4, in the first embodiment, TTL/2ih=0.704, therefore the aforementioned condition (1) is satisfied; additionally, ih/f=0.819, therefore the aforementioned condition (2) is satisfied; furthermore, f/f12345=1.026, therefore the aforementioned condition (3) is satisfied; and f/f6=0.205, thus the aforementioned condition (4) is satisfied.

Figure 2:
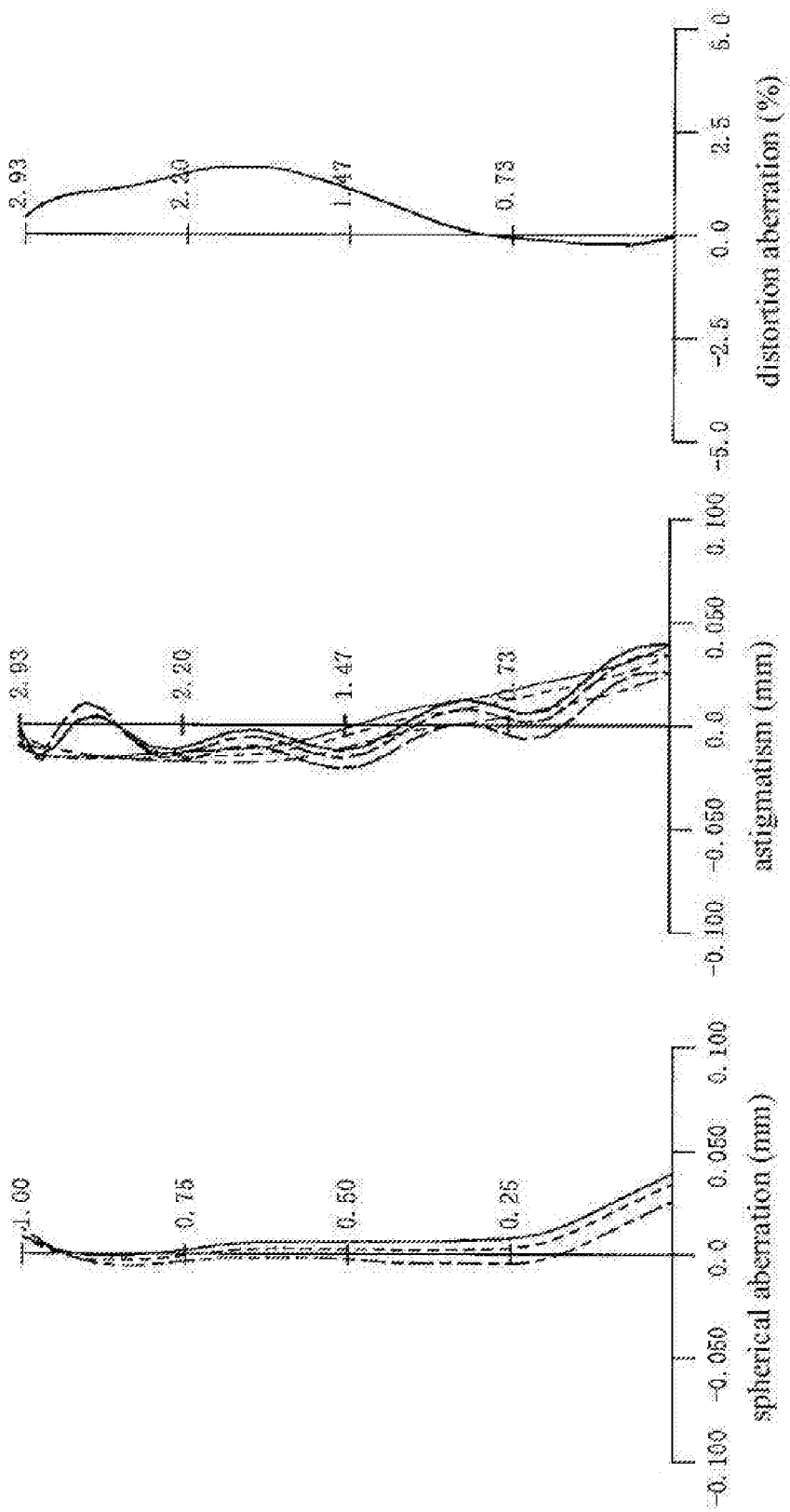
FIG. 2 is a diagram of aberrations of the first embodiment in an infinity in-focus state.

FIG. 2 is a diagram of aberrations of the first embodiment in an infinity in-focus state.

FIG. 2 shows the diagram of the spherical aberration, the astigmatism, and the distortion aberration.

In the diagram of and the spherical aberration and the astigmatism, the dash line represents the value of d-line (wavelength 587.6 nm), the dash and dot line represents the value of g-line (wavelength 435.8 nm), and the solid line represents the value of c-line (wavelength 656.3 nm). In addition, in the diagram of the astigmatism, the bold line represents the value of the sagittal image surface, and the thin line represents the value of the tangential image surface.

Furthermore, in the diagram of the distortion aberration, since the shapes of the d-line, g-line, and the c-line are substantially identical, the d-line is illustrated as a representative.

According to the diagrams of the aberrations, the aberrations in the first embodiment are sufficiently corrected, and the imaging performance is improved.

The Second Embodiment

Figure 3:
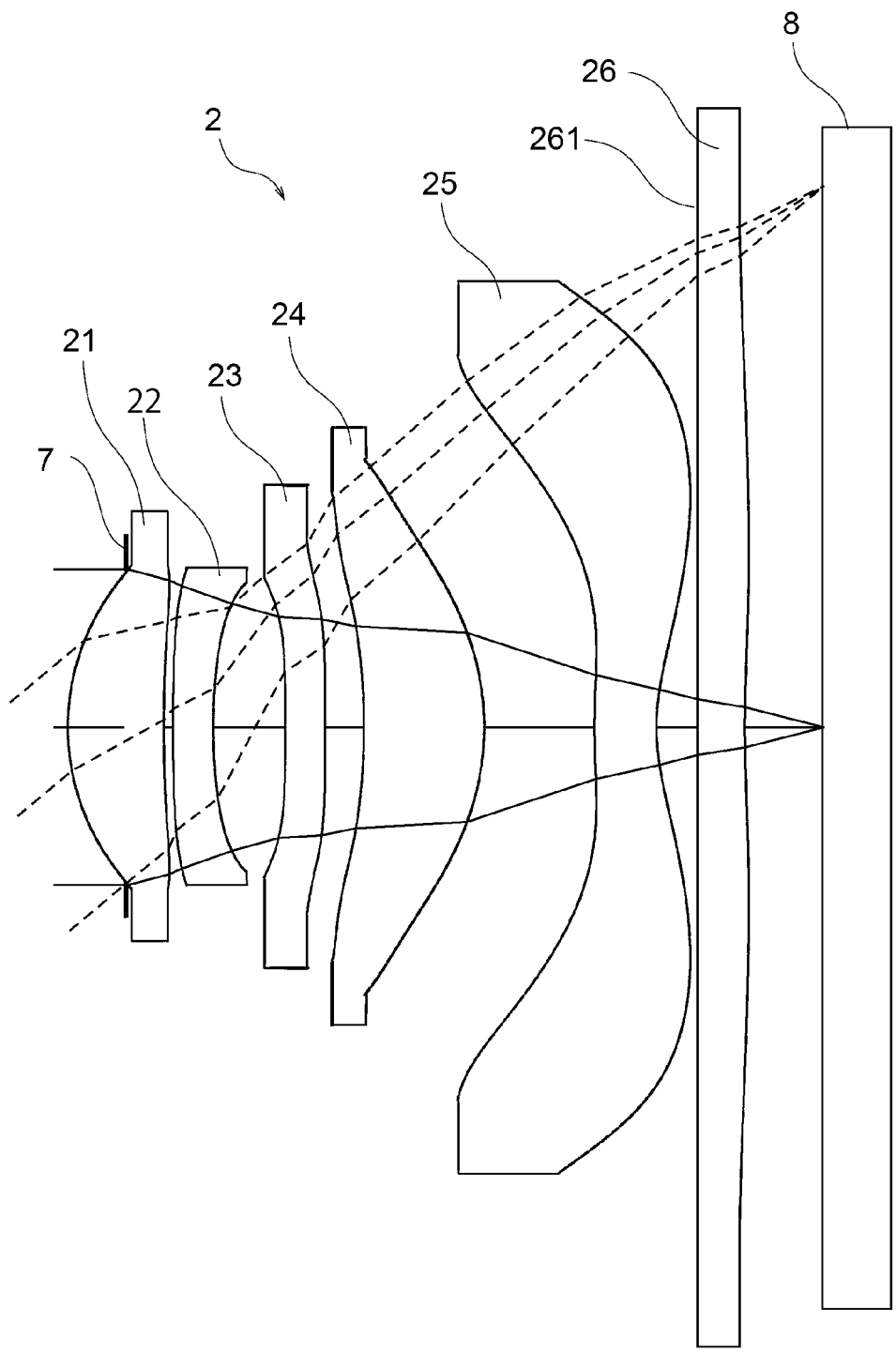
FIG. 3 is a schematic diagram of an imaging optical system according to a second embodiment.

FIG. 3 is a schematic diagram of an imaging optical 2 according to a second embodiment.

The imaging lens 2 according to the second embodiment includes, in order from the object side to the image side: a first lens 21 having a positive refractive power; a second lens 22 having a negative refractive power; a third lens 23 having a negative refractive power; a fourth lens 24 having a positive refractive power, a fifth lens 25 having a negative refractive power at the center of the lens and having an inflection point outside the optical axis, and a sixth lens 26 having a negative refractive power and having an inflection point outside the optical axis.

At the object side, the first lens 21 is provided with an aperture 7 with a fixed opening, and an imaging surface of an imaging element (image sensor) 8 is arranged at the imaging surface of the imaging lens 2.

The sixth lens 26 according to the second embodiment is a lens made of ultraviolet curable resin, and the front surface of the sixth lens 26 is a plane. Additionally, a dye infrared-cut filter layer 261 is formed on the front surface of the sixth lens 26 via spin coating.

The data of lenses of the imaging lens 2 according to the second embodiment are shown in TABLE 5.

TABLE 5

| optical element | Sn | R | D | nd | vd |
|---|---|---|---|---|---|
| aperture | 1 | ∞ | −0.308 | 1.00000 | 0.0 |
| L1 | 2 | 1.263 | 0.524 | 1.54392 | 55.9 |
|    | 3 | 7.077 | 0.050 | 1.00000 | 0.0 |
| L2 | 4 | 11.512 | 0.220 | 1.66120 | 20.3 |
|    | 5 | 3.163 | 0.393 | 1.00000 | 0.0 |
| L3 | 6 | 101.965 | 0.216 | 1.66120 | 20.3 |
|    | 7 | 18.673 | 0.215 | 1.00000 | 0.0 |
| L4 | 8 | −3.932 | 0.657 | 1.54392 | 55.9 |
|    | 9 | −1.473 | 0.600 | 1.00000 | 0.0 |
| L5 | 10 | 3.677 | 0.340 | 1.53463 | 56.3 |
|    | 11 | 1.196 | 0.224 | 1.00000 | 0.0 |
| L6 | 12 | ∞ | 0.260 | 1.57680 | 31.5 |
|    | 13 | 12.639 | 0.429 | 1.00000 | 0.0 |

In the imaging lens 2, the twelve surfaces (from the second surface to the thirteenth lens) of lenses from the first lens 21 to the sixth lens 26 are aspherical surfaces, except for the front surface (the twelfth surface) of the sixth lens 26.

The aspheric coefficients and conic constant k of the aspherical surfaces according to the second embodiment are shown in TABLE 6 and TABLE 7.

TABLE 6

| Sn | K | A3 | A4 | A5 | A6 |
|----|---|----|----|----|----|
| 2 | 0.0000E+00 | −4.1779E−02 | 4.6626E−01 | −2.7401E+00 | 9.2007E+00 |
| 3 | 0.0000E+00 | −2.5821E−02 | 2.4419E−01 | −1.3649E+00 | 3.6857E+00 |
| 4 | 0.0000E+00 | 2.0479E−02 | −1.1907E−01 | 4.8235E−01 | −8.9386E+00 |
| 5 | 0.0000E+00 | −1.2865E−02 | 1.3473E−01 | −1.5556E−01 | 1.1315E+00 |
| 6 | 0.0000E+00 | −2.1827E−02 | −6.5689E−02 | −1.0626E+00 | 1.1458E+00 |
| 7 | 0.0000E+00 | 1.9930E−02 | −4.6682E−01 | 1.0742E+00 | −1.5443E+00 |
| 8 | 0.0000E+00 | −9.3013E−02 | 6.8440E−01 | −2.3908E+00 | 3.8500E−01 |
| 9 | −2.9317E−01 | −1.3446E−01 | 8.5123E−01 | −3.2006E+00 | 6.9464E+00 |

TABLE 6-continued

| Sn | K | A3 | A4 | A5 | A6 |
|---|---|---|---|---|---|
| 10 | 0.0000E+00 | 2.5293E−01 | −2.0698E+00 | 4.0475E+00 | −5.0260E+00 |
| 11 | −1.2305E+01 | 1.5637E−01 | −3.9429E−01 | 1.4245E−01 | 2.7881E−01 |
| 13 | 0.0000E+00 | 9.9944E−02 | −3.0667E−01 | 3.7650E−01 | −3.7361E−01 |

TABLE 7

| Sn | A7 | A8 | A9 | A10 | A11 | A12 |
|---|---|---|---|---|---|---|
| 2 | −1.5952E+01 | 5.8712E+00 | 2.9697E+01 | −5.8849E+01 | 4.6168E+01 | −1.3927E+01 |
| 3 | −5.2658E+00 | 3.1801E+00 | 6.9671E−01 | −3.6795E−01 | −2.4640E+00 | 1.5773E+00 |
| 4 | −6.7623E−01 | 1.1080E+01 | −3.2470E+01 | 4.8329E+01 | −3.7587E+01 | 1.1998E+01 |
| 5 | −9.7410E+00 | 4.6849E+01 | −1.2044E+02 | 1.7404E+02 | −1.3386E+02 | 4.3060E+01 |
| 6 | 1.2384E+01 | −6.4381E+01 | 1.4543E+02 | −1.7787E+02 | 1.1734E+02 | −3.2205E+01 |
| 7 | −3.8418E+00 | 2.1668E+01 | −4.3800E+01 | 4.6714E+01 | −2.5452E+01 | 5.5075E+00 |
| 8 | 1.9632E+01 | −6.0861E+01 | 8.8738E+01 | −7.0142E+01 | 2.8930E+01 | −4.8909E+00 |
| 9 | −8.5337E+00 | 5.6198E+00 | −1.4500E+00 | −2.2448E−01 | 1.5272E−01 | −8.5427E−03 |
| 10 | 4.1229E+00 | −2.0900E+00 | 5.8400E−01 | −6.8156E−02 | 0.0000E+00 | 0.0000E+00 |
| 11 | −3.8805E−01 | 2.1841E−01 | −6.0797E−02 | 6.8371E−03 | 0.0000E+00 | 0.0000E+00 |
| 13 | 3.1173E−01 | −1.7808E−01 | 6.0581E−02 | −1.0720E−02 | 6.6026E−04 | 2.4307E−05 |

TABLE 8 shows the focal length f of the overall system, the F-value, the full field angle, the maximal image height, total track length (TTL), the combined focal length f12345 of the lenses from the first lens 21 to the fifth lens 25, and the focal length f6 of the sixth lens 26 according to the illustrated embodiment.

TABLE 8

| f(mm) | 3.57 |
|---|---|
| F-value | 2.08 |
| full field angle(°) | 79.1 |
| maximal image height(mm) | 2.934 |
| TTL(mm) | 4.129 |
| f12345(mm) | 3.49 |
| f6(mm) | −21.91 |

According to TABLE 8, in the second embodiment, TTL/2ih=0.704, therefore the aforementioned condition (1) is satisfied; additionally, ih/f=0.823, therefore the aforementioned condition (2) is satisfied; furthermore, f/f12345=1.021, therefore the aforementioned condition (3) is satisfied; and f/f6=−0.163, thus the aforementioned condition (4) is satisfied.

Figure 4:
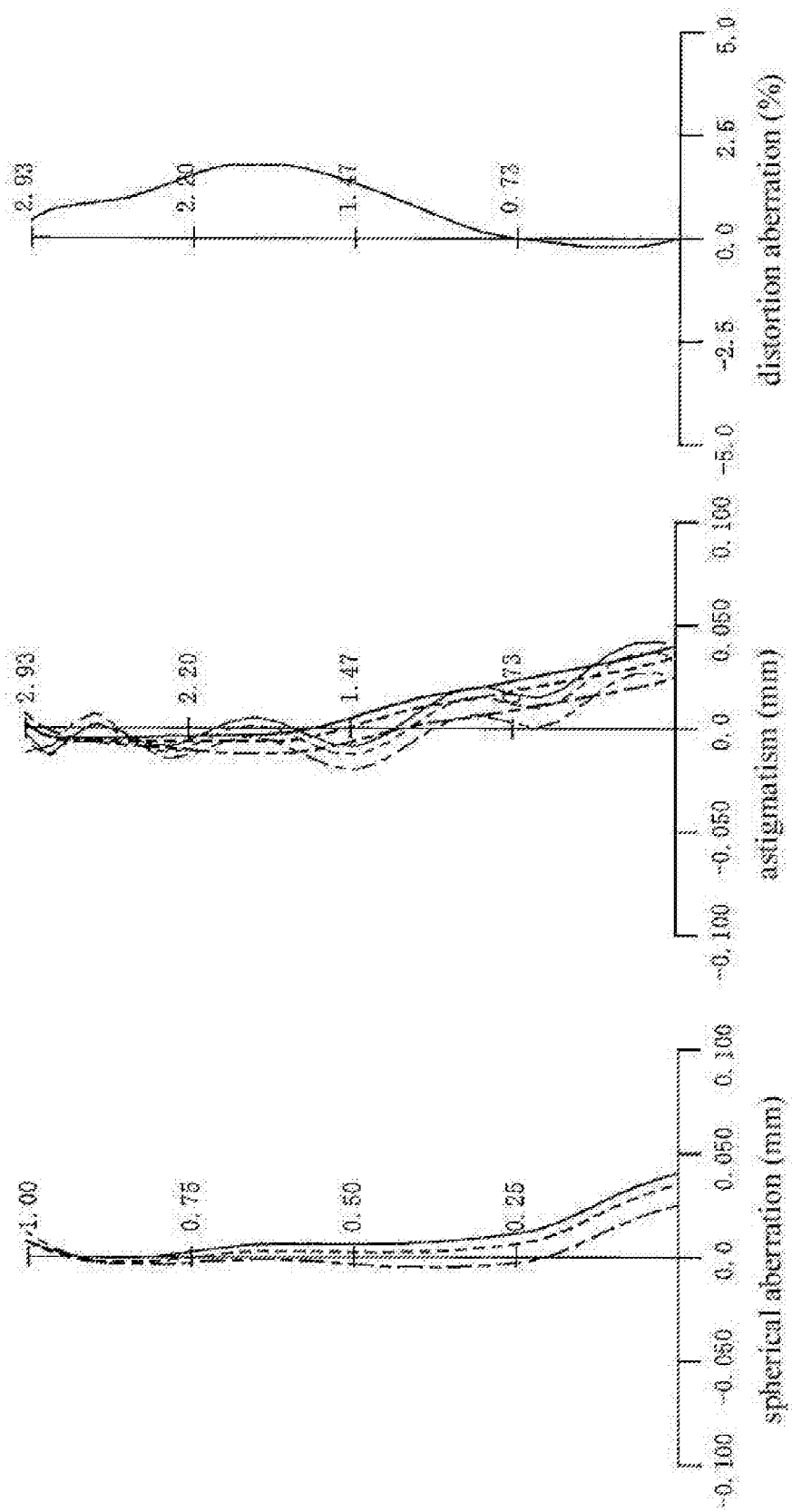
FIG. 4 is a diagram of aberrations of the second embodiment in an infinity in-focus state.

FIG. 4 is a diagram of aberrations of the second embodiment in an infinity in-focus state.

FIG. 4 shows the diagram of the spherical aberration, the astigmatism, and the distortion aberration.

In the diagram of and the spherical aberration and the astigmatism, the dash line represents the value of d-line (wavelength 587.6 nm), the dash and dot line represents the value of g-line (wavelength 435.8 nm), and the solid line represents the value of c-line (wavelength 656.3 nm). In addition, in the diagram of the astigmatism, the bold line represents the value of the sagittal image surface, and the thin line represents the value of the tangential image surface.

Furthermore, in the diagram of the distortion aberration, since the shapes of the d-line, g-line, and the c-line are substantially identical, the d-line is illustrated as a representative.

According to the diagrams of the aberrations, the aberrations in the second embodiment are sufficiently corrected, and the imaging performance is improved.

The Third Embodiment

Figure 5:
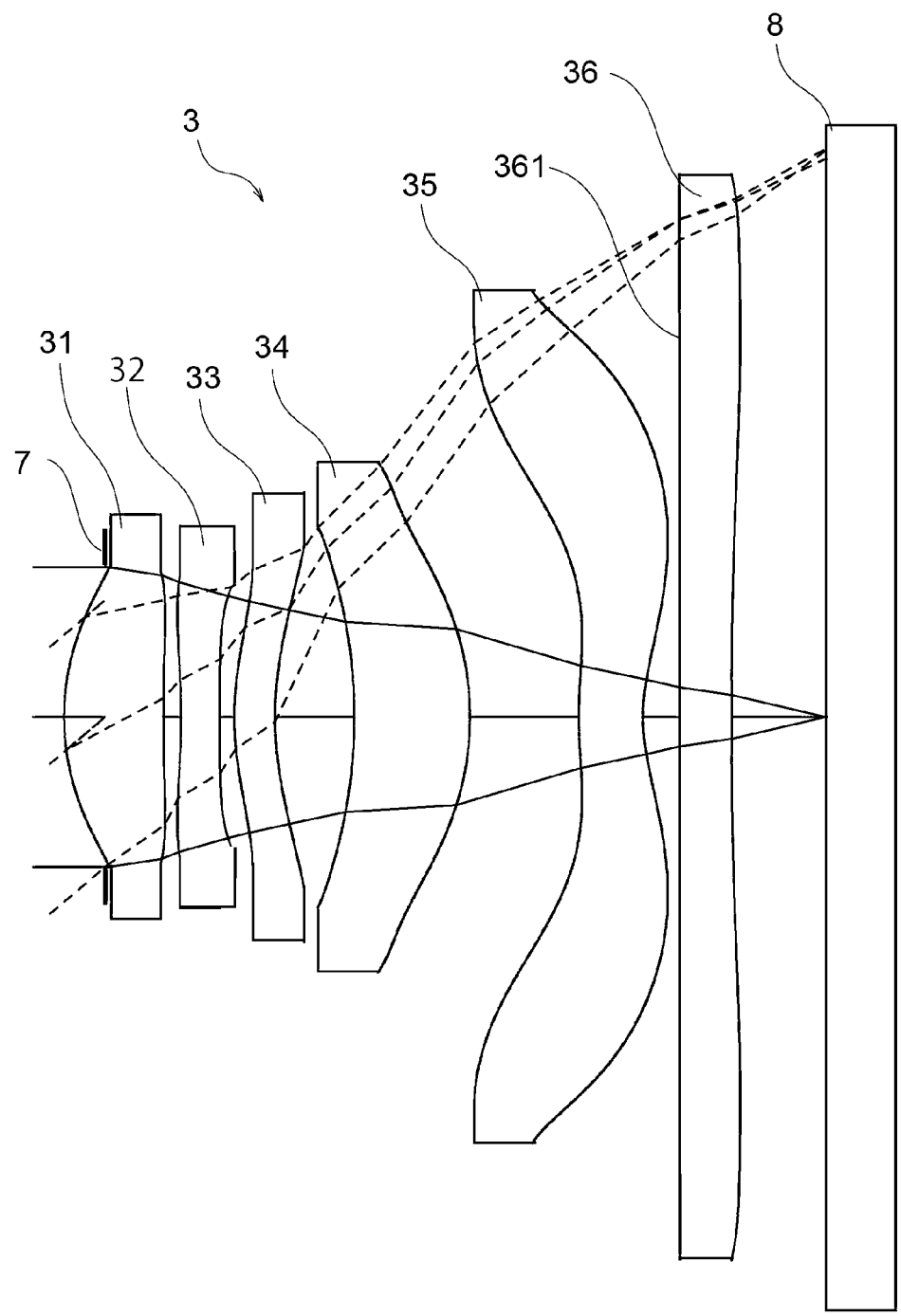
FIG. 5 is a schematic diagram of an imaging optical system according to a third embodiment.

FIG. 5 is a schematic diagram of an imaging optical system according to a third embodiment.

The imaging lens 3 according to the third embodiment includes, in order from the object side to the image side: a first lens 31 having a positive refractive power; a second lens 32 having a negative refractive power; a third lens 33 having a positive refractive power; a fourth lens 34 having a positive refractive power, a fifth lens 35 having a negative refractive power at the center of the lens and having an inflection point outside the optical axis, and a sixth lens 36 having a positive refractive power and having an inflection point outside the optical axis.

At the object side, the first lens 31 is provided with an aperture 7 with a fixed opening, and an imaging surface of an imaging element (image sensor) 8 is arranged at the imaging surface of the imaging lens 3.

The sixth lens 36 according to the third embodiment is a lens made of ultraviolet curable resin, and the front surface of the sixth lens 36 is a plane. Additionally, a dye infrared-cut filter layer 361 is formed on the front surface of the sixth lens 36 via spin coating.

The data of lenses of the imaging lens 3 according to the third embodiment are shown in TABLE 9.

TABLE 9

| optical element | Sn | R | D | nd | vd |
|---|---|---|---|---|---|
| aperture | 1 | ∞ | −0.213 | 1.00000 | 0.0 |
| L1 | 2 | 1.263 | 0.513 | 1.54392 | 55.9 |
|  | 3 | 8.513 | 0.092 | 1.00000 | 0.0 |
| L2 | 4 | −3.335 | 0.200 | 1.66120 | 20.3 |
|  | 5 | −237.479 | 0.075 | 1.00000 | 0.0 |
| L3 | 6 | 1.544 | 0.210 | 1.61500 | 25.9 |
|  | 7 | 1.721 | 0.409 | 1.00000 | 0.0 |
| L4 | 8 | −2.826 | 0.598 | 1.54392 | 55.9 |
|  | 9 | −1.560 | 0.562 | 1.00000 | 0.0 |
| L5 | 10 | 2.387 | 0.332 | 1.53463 | 56.3 |
|  | 11 | 0.953 | 0.189 | 1.00000 | 0.0 |
| L6 | 12 | ∞ | 0.270 | 1.60176 | 30.7 |
|  | 13 | −12.777 | 0.488 | 1.00000 | 0.0 |

In the imaging lens 3, the twelve surfaces (from the second surface to the thirteenth lens) of lenses from the first lens 31 to the sixth lens 36 are aspherical surfaces, except for the front surface (the twelfth surface) of the sixth lens 36.

The aspheric coefficients and conic constant k of the aspherical surfaces according to the third embodiment are shown in TABLE 10 and TABLE 11.

TABLE 10

| Sn | K | A3 | A4 | A5 | A6 |
|---|---|---|---|---|---|
| 2 | 0.0000E+00 | 8.4746E−03 | −2.0330E−01 | 1.5375E+00 | −6.8302E+00 |
| 3 | 0.0000E+00 | 3.5044E−02 | −4.6074E−01 | 2.6398E+00 | −1.0221E+01 |
| 4 | 0.0000E+00 | 3.3910E−02 | 1.7567E−02 | 1.8396E+00 | −6.6219E+00 |
| 5 | 0.0000E+00 | 2.2429E−02 | −1.3663E−01 | 1.9420E+00 | −6.6898E+00 |
| 6 | 0.0000E+00 | −2.2568E−02 | −1.1062E−01 | −2.0447E+00 | 8.3766E+00 |
| 7 | 0.0000E+00 | 1.8413E−02 | −4.6749E−01 | 1.5877E+00 | −2.3535E+00 |
| 8 | 0.0000E+00 | −2.4234E−03 | −1.1326E−01 | 1.1596E+00 | −7.3897E+00 |
| 9 | 0.0000E+00 | −4.7682E−02 | 4.3834E−02 | −2.9198E−01 | 2.4792E+00 |
| 10 | 0.0000E+00 | 2.5679E−01 | −2.5959E+00 | 4.7993E+00 | −5.1648E+00 |
| 11 | −1.2305E+01 | 7.0168E−02 | −1.3035E−01 | −7.5693E−01 | 1.8017E+00 |
| 13 | −8.0158E−01 | 1.5472E−01 | −9.4569E−02 | −1.6742E−01 | 3.3393E+00 |

TABLE 11

| Sn | A7 | A8 | A9 | A10 | A11 | A12 |
|---|---|---|---|---|---|---|
| 2 | 1.7596E+01 | −2.6739E+01 | 2.2068E+01 | −7.8312E+00 | 0.0000E+00 | 0.0000E+00 |
| 3 | 2.2842E+01 | −3.0447E+01 | 2.2174E+01 | −6.8784E+00 | 0.0000E+00 | 0.0000E+00 |
| 4 | 1.1918E+01 | −1.1133E+01 | 4.6901E+00 | −4.0497E−01 | 0.0000E+00 | 0.0000E+00 |
| 5 | 1.6219E+01 | −2.4688E+01 | 2.1894E+01 | −8.3755E+00 | 0.0000E+00 | 0.0000E+00 |
| 6 | −1.7162E+01 | 1.2748E+01 | 2.3716E+01 | −7.2320E+01 | 7.5204E+01 | −2.9416E+01 |
| 7 | −8.8925E+00 | 4.8041E+01 | −9.9958E+01 | 1.1114E+02 | −6.4734E+01 | 1.5458E+01 |
| 8 | 2.7121E+01 | −6.0812E+01 | 8.5241E+01 | −7.3255E+01 | 3.5675E+01 | −7.6414E+00 |
| 9 | −9.7080E+00 | 2.1833E+01 | −2.9438E+01 | 2.3507E+01 | −1.0156E+01 | 1.8140E+00 |
| 10 | 3.4632E+00 | −1.3664E+00 | 2.8450E+01 | −2.3766E−02 | 0.0000E+00 | 0.0000E+00 |
| 11 | −1.8346E+00 | 1.0069E+00 | −2.9062E−01 | 3.4568E−02 | 0.0000E+00 | 0.0000E+00 |
| 13 | −2.5174E−01 | 9.7286E−02 | −1.9037E−02 | 1.4889E−03 | 1.8854E−07 | 8.2303E−08 |

TABLE 12 shows the focal length f of the overall system, the F-value, the full field angle, the maximal image height, total track length (TTL), the combined focal length f12345 of the lenses from the first lens 31 to the fifth lens 35, and the focal length f6 of the sixth lens 36 according to the illustrated embodiment.

TABLE 12

| | |
|---|---|
| f(mm) | 3.50 |
| F-value | 2.26 |
| full field angle(°) | 80.3 |
| maximal image height(mm) | 2.934 |
| TTL(mm) | 3.939 |
| f12345(mm) | 3.59 |
| f6(mm) | 21.23 |

According to TABLE 12, in the third embodiment, TTL/2ih=0.671, therefore the aforementioned condition (1) is satisfied; additionally, ih/f=0.839, therefore the aforementioned condition (2) is satisfied; furthermore, f/f12345=0.974, therefore the aforementioned condition (3) is satisfied; and f/f6=0.165, thus the aforementioned condition (4) is satisfied.

Figure 6:
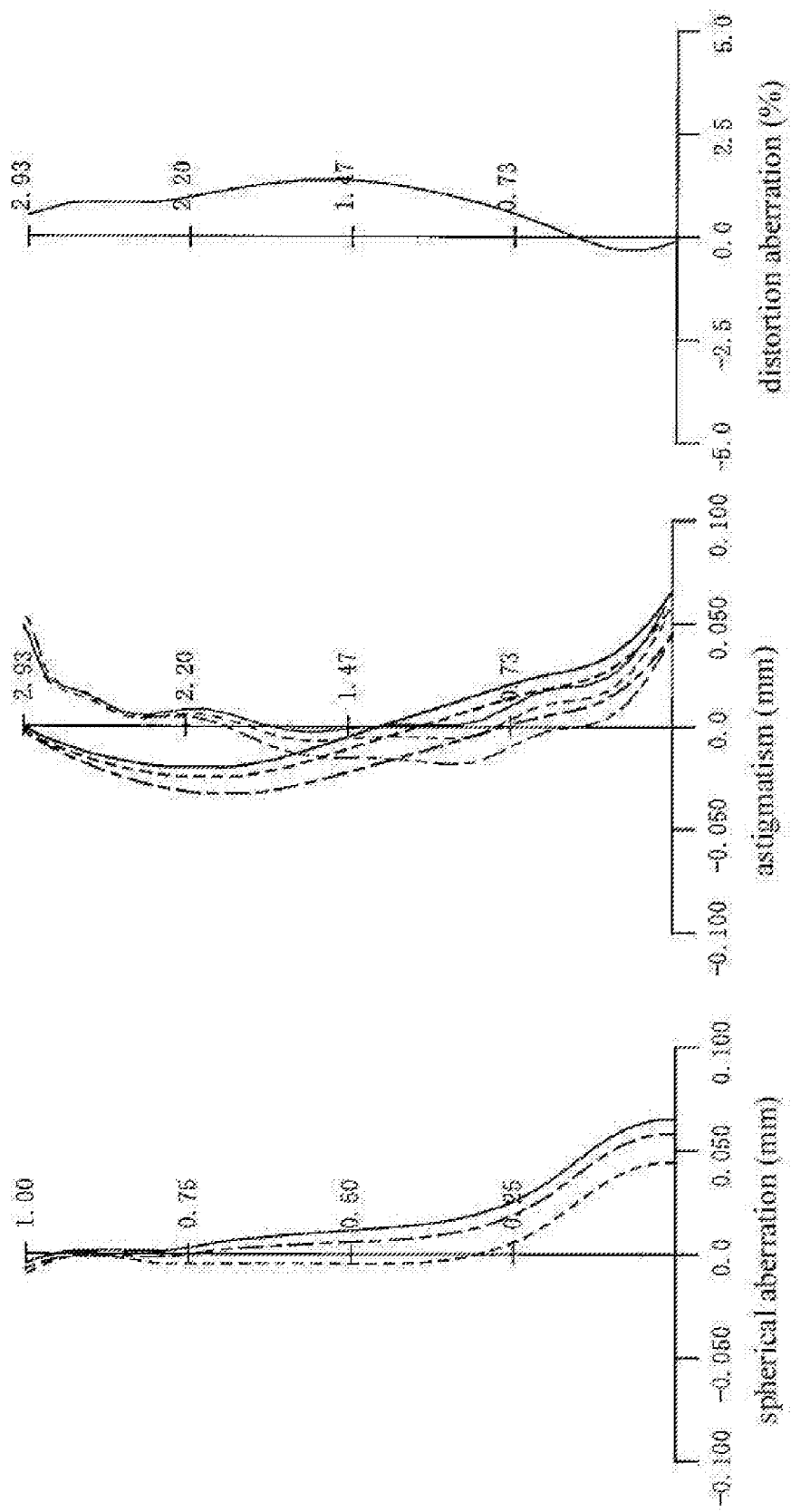
FIG. 6 is a diagram of aberrations of the third embodiment in an infinity in-focus state.

FIG. 6 is a diagram of aberrations of the third embodiment in an infinity in-focus state.

FIG. 6 shows the diagram of the spherical aberration, the astigmatism, and the distortion aberration.

In the diagram of and the spherical aberration and the astigmatism, the dash line represents the value of d-line (wavelength 587.6 nm), the dash and dot line represents the value of g-line (wavelength 435.8 nm), and the solid line represents the value of c-line (wavelength 656.3 nm). In addition, in the diagram of the astigmatism, the bold line represents the value of the sagittal image surface, and the thin line represents the value of the tangential image surface.

Furthermore, in the diagram of the distortion aberration, since the shapes of the d-line, g-line, and the c-line are substantially identical, the d-line is illustrated as a representative.

According to the diagrams of the aberrations, the aberrations in the third embodiment are sufficiently corrected, and the imaging performance is improved.

The Fourth Embodiment

Figure 7:
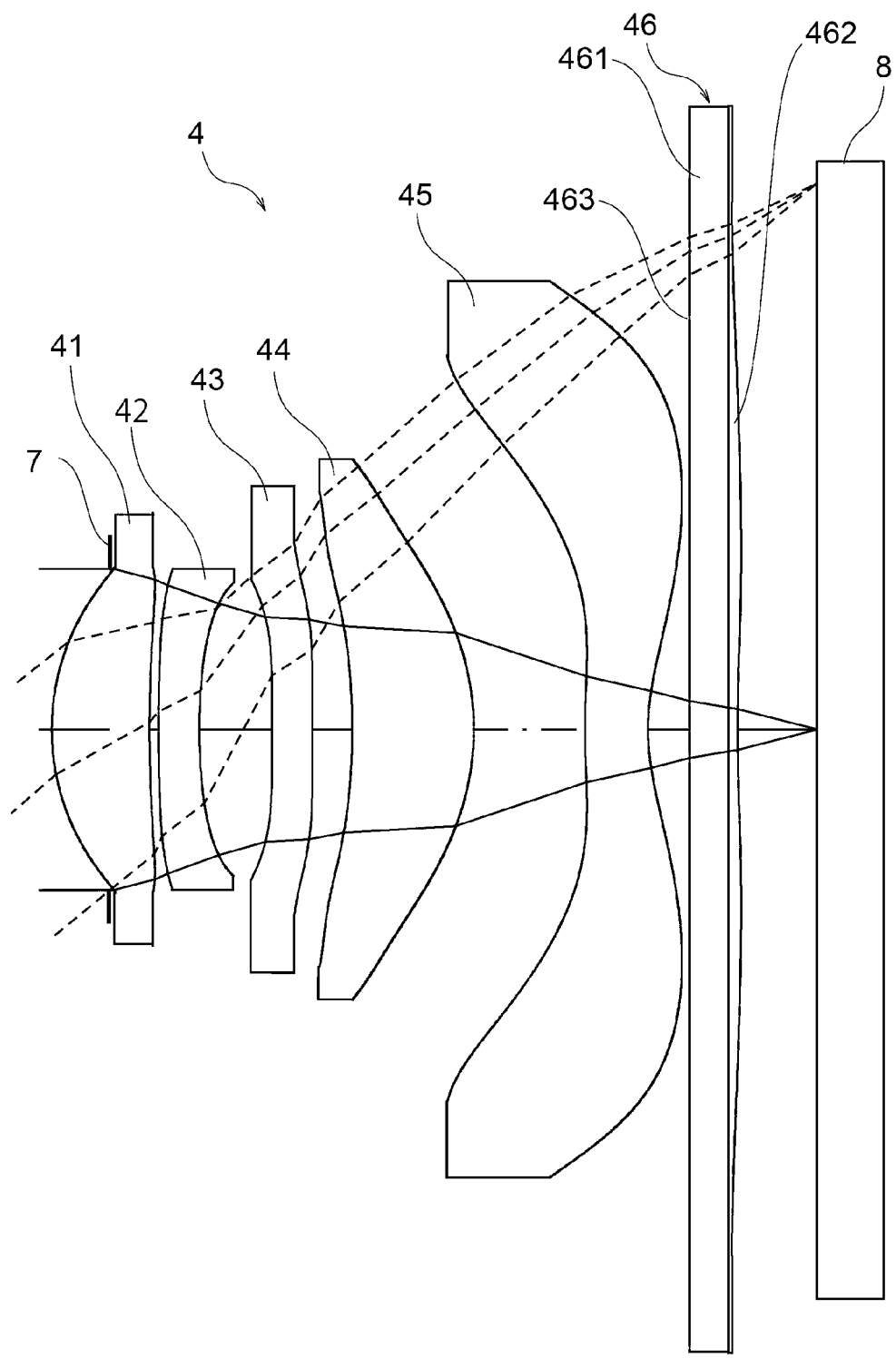
FIG. 7 is a schematic diagram of an imaging optical system according to a fourth embodiment.

FIG. 7 is a schematic diagram of an imaging optical 4 according to a fourth embodiment.

The imaging lens 4 according to the fourth embodiment includes, in order from the object side to the image side: a first lens 41 having a positive refractive power; a second lens 42 having a negative refractive power; a third lens 43 having a negative refractive power; a fourth lens 44 having a positive refractive power, a fifth lens 45 having a negative refractive power at the center of the lens and having an inflection point outside the optical axis, and a sixth lens 46 having a negative refractive power and having an inflection point outside the optical axis.

At the object side, the first lens 41 is provided with an aperture 7 with a fixed opening, and an imaging surface of an imaging element (image sensor) 8 is arranged at the imaging surface of the imaging lens 4.

The sixth lens 46 in the fourth embodiment is a compound lens consist of a glass substrate 461 made of blue glass and a lens portion 462 made of ultraviolet curable resin. In addition, an infrared-cut filter film 463 is formed on the front surface of the glass substrate 461 via vacuum deposition.

The data of lenses of the imaging lens 4 according to the fourth embodiment are shown in TABLE 13.

TABLE 13

| optical element | Sn | R | D | nd | νd |
|---|---|---|---|---|---|
| aperture | 1 | ∞ | −0.315 | 1.00000 | 0.0 |
| L1 | 2 | 1.263 | 0.526 | 1.54392 | 55.9 |
|  | 3 | 7.073 | 0.049 | 1.00000 | 0.0 |
| L2 | 4 | 11.517 | 0.220 | 1.66120 | 20.3 |
|  | 5 | 3.163 | 0.393 | 1.00000 | 0.0 |
| L3 | 6 | 101.481 | 0.216 | 1.66120 | 20.3 |
|  | 7 | 18.699 | 0.216 | 1.00000 | 0.0 |
| L4 | 8 | −3.931 | 0.656 | 1.54392 | 55.9 |
|  | 9 | −1.473 | 0.599 | 1.00000 | 0.0 |
| L5 | 10 | 3.679 | 0.340 | 1.53463 | 56.3 |
|  | 11 | 1.200 | 0.223 | 1.00000 | 0.0 |
| L6(substrate) | 12 | ∞ | 0.210 | 1.51680 | 64.2 |
| L6(lens) | 13 | ∞ | 0.050 | 1.57680 | 31.5 |
|  | 14 | 12.686 | 0.429 | 1.00000 | 0.0 |

In the imaging lens 4, the thirteen surfaces (from the second surface to the fourteenth lens) of lenses from the first lens 41 to the lens portion 462 of the sixth lens 46 are aspherical surfaces, except for two surfaces (the twelfth surface and the thirteenth lens) of the substrate 461.

The aspheric coefficients and conic constant k of the aspherical surfaces according to the fourth embodiment are shown in TABLE 14 and TABLE 15.

TABLE 14

| Sn | K | A3 | A4 | A5 | A6 |
|---|---|---|---|---|---|
| 2 | 0.0000E+00 | −4.2094E−02 | 4.6624E−01 | −2.7403E+00 | 9.2003E+00 |
| 3 | 0.0000E+00 | −2.6090E−02 | 2.4361E−01 | −1.3657E+00 | 3.6847E+00 |
| 4 | 0.0000E+00 | 2.0036E−02 | −1.1964E−01 | 4.8177E−01 | −8.9433E−01 |
| 5 | 0.0000E+00 | −1.2705E−02 | 1.3458E−01 | −1.5600E−01 | 1.1309E+00 |
| 6 | 0.0000E+00 | −2.1765E−02 | −6.5903E−02 | −1.0631E+00 | 1.1452E+00 |
| 7 | 0.0000E+00 | 1.9625E−02 | −4.6706E−01 | 1.0740E+00 | −1.5444E+00 |
| 8 | 0.0000E+00 | −9.3068E−02 | 6.8439E−01 | −2.3909E+00 | 3.8500E−01 |
| 9 | −2.9317E−01 | −1.3439E−01 | 8.5121E−01 | −3.2006E+00 | 6.9464E+00 |
| 10 | 0.0000E+00 | 2.2804E−01 | −1.8122E+00 | 2.9477E+00 | −2.4561E+00 |
| 11 | −1.2305E+01 | 1.5699E−01 | −3.2244E−01 | −3.4759E−01 | 1.6273E+00 |
| 14 | 0.0000E+00 | 9.9928E−02 | −3.0668E−01 | 3.7650E−01 | −3.7361E−01 |

TABLE 15

| Sn | A7 | A8 | A9 | A10 | A11 | A12 |
|---|---|---|---|---|---|---|
| 2 | −1.5952E+01 | 5.8714E+00 | 2.9697E+01 | −5.8849E+01 | 4.6167E+01 | −1.3930E+01 |
| 3 | −5.2671E+00 | 3.1788E+00 | 6.9575E−01 | −3.6806E−01 | −2.4628E+00 | 1.5802E+00 |
| 4 | −6.7663E−01 | 1.1079E+01 | −3.2470E+01 | 4.8329E+01 | −3.7586E+01 | 1.2001E+01 |
| 5 | −9.7413E+00 | 4.6849E+01 | −1.2044E+02 | 1.7404E+02 | −1.3386E+02 | 4.3057E+01 |
| 6 | 1.2384E+01 | −6.4382E+01 | 1.4543E+02 | −1.7887E+02 | 1.1734E+02 | −3.2205E+01 |
| 7 | −3.8419E+00 | 2.1668E+01 | −4.3800E+01 | 4.6714E+01 | −2.5452E+01 | 5.5075E+00 |
| 8 | 1.9632E+01 | −6.0861E+01 | 8.8738E+01 | −7.0142E+01 | 2.8930E+01 | −4.8909E+00 |
| 9 | −8.5337E+00 | 5.6198E+00 | −1.4500E+00 | −2.2447E−01 | 1.5272E−01 | −8.5378E−03 |
| 10 | 4.6388E−01 | 1.2272E+00 | −1.3426E+00 | 6.2652E−01 | −1.4168E−01 | 1.2495E−02 |
| 11 | −2.3973E+00 | 2.0099E+00 | −1.0461E+00 | 3.3490E−01 | −6.0694E−02 | 4.7923E−03 |
| 14 | 3.1173E−01 | −1.7808E−01 | 6.0581E−02 | −1.0720E−02 | 6.6026E−04 | 2.4310E−05 |

TABLE 16 shows the focal length f of the overall system, the F-value, the full field angle, the maximal image height, total track length (TTL), the combined focal length f12345 of the lenses from the first lens 41 to the fifth lens 45, and the focal length f6 of the sixth lens 46 according to the illustrated embodiment.

TABLE 16

| f(mm) | 3.56 |
|---|---|
| F-value | 2.06 |
| full field angle(°) | 79.0 |
| maximal image height(mm) | 2.934 |
| TTL(mm) | 4.127 |
| f12345(mm) | 3.49 |
| f6(mm) | −21.99 |

According to TABLE 16, in the fourth embodiment, TTL/2ih=0.703, therefore the aforementioned condition (1) is satisfied; additionally, ih/f=0.823, therefore the aforementioned condition (2) is satisfied; furthermore, f/f12345=1.021, therefore the aforementioned condition (3) is satisfied; and f/f6=−0.162, thus the aforementioned condition (4) is satisfied.

Figure 8:
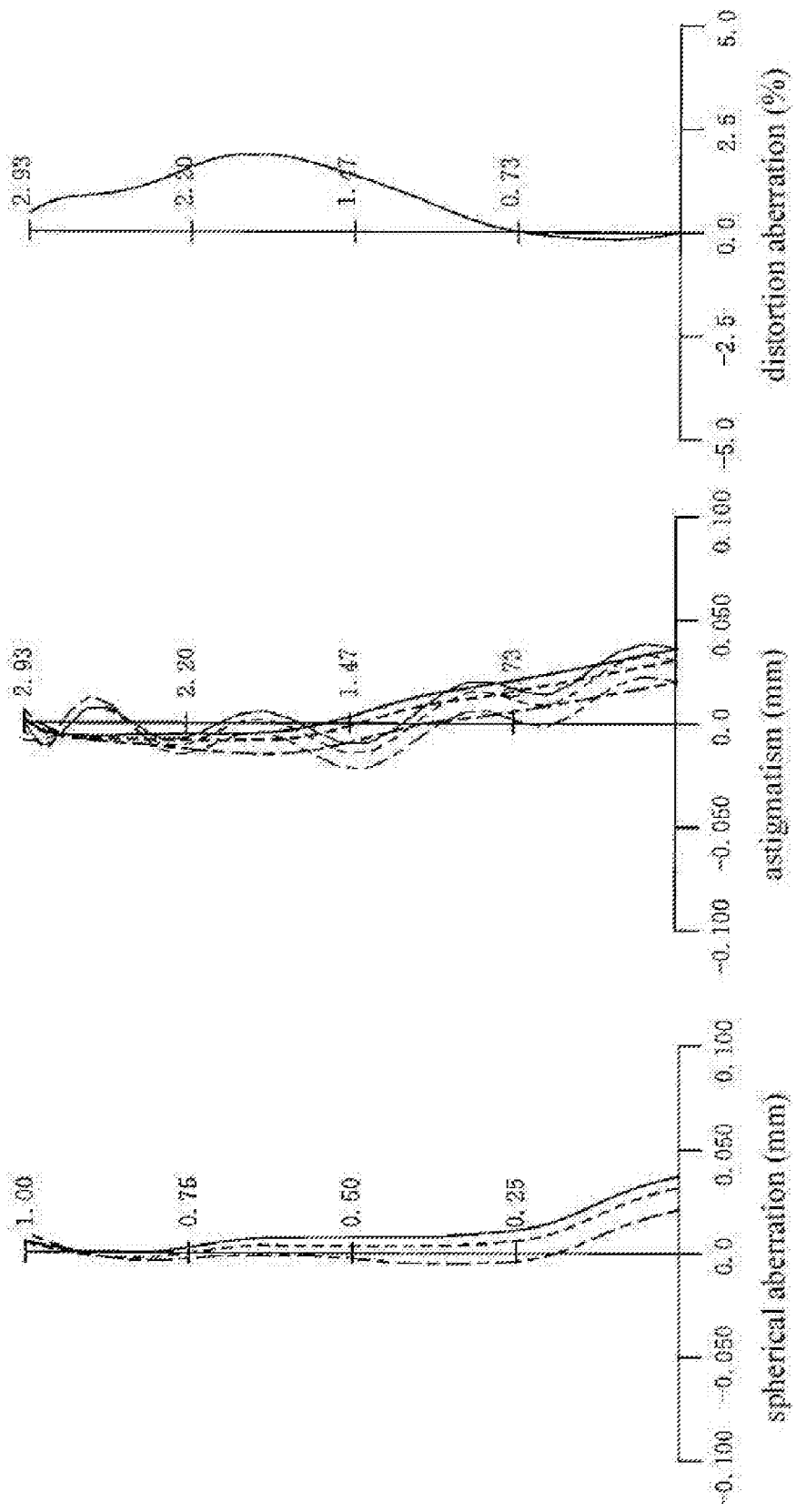
FIG. 8 is a diagram of aberrations of the fourth embodiment in an infinity in-focus state.

FIG. 8 is a diagram of aberrations of the fourth embodiment in an infinity in-focus state.

FIG. 8 shows the diagram of the spherical aberration, the astigmatism, and the distortion aberration.

In the diagram of and the spherical aberration and the astigmatism, the dash line represents the value of d-line (wavelength 587.6 nm), the dash and dot line represents the value of g-line (wavelength 435.8 nm), and the solid line represents the value of c-line (wavelength 656.3 nm). In addition, in the diagram of the astigmatism, the bold line represents the value of the sagittal image surface, and the thin line represents the value of the tangential image surface.

Furthermore, in the diagram of the distortion aberration, since the shapes of the d-line, g-line, and the c-line are substantially identical, the d-line is illustrated as a representative.

According to the diagrams of the aberrations, the aberrations in the fourth embodiment are sufficiently corrected, and the imaging performance is improved.

The Fifth Embodiment

Figure 9:
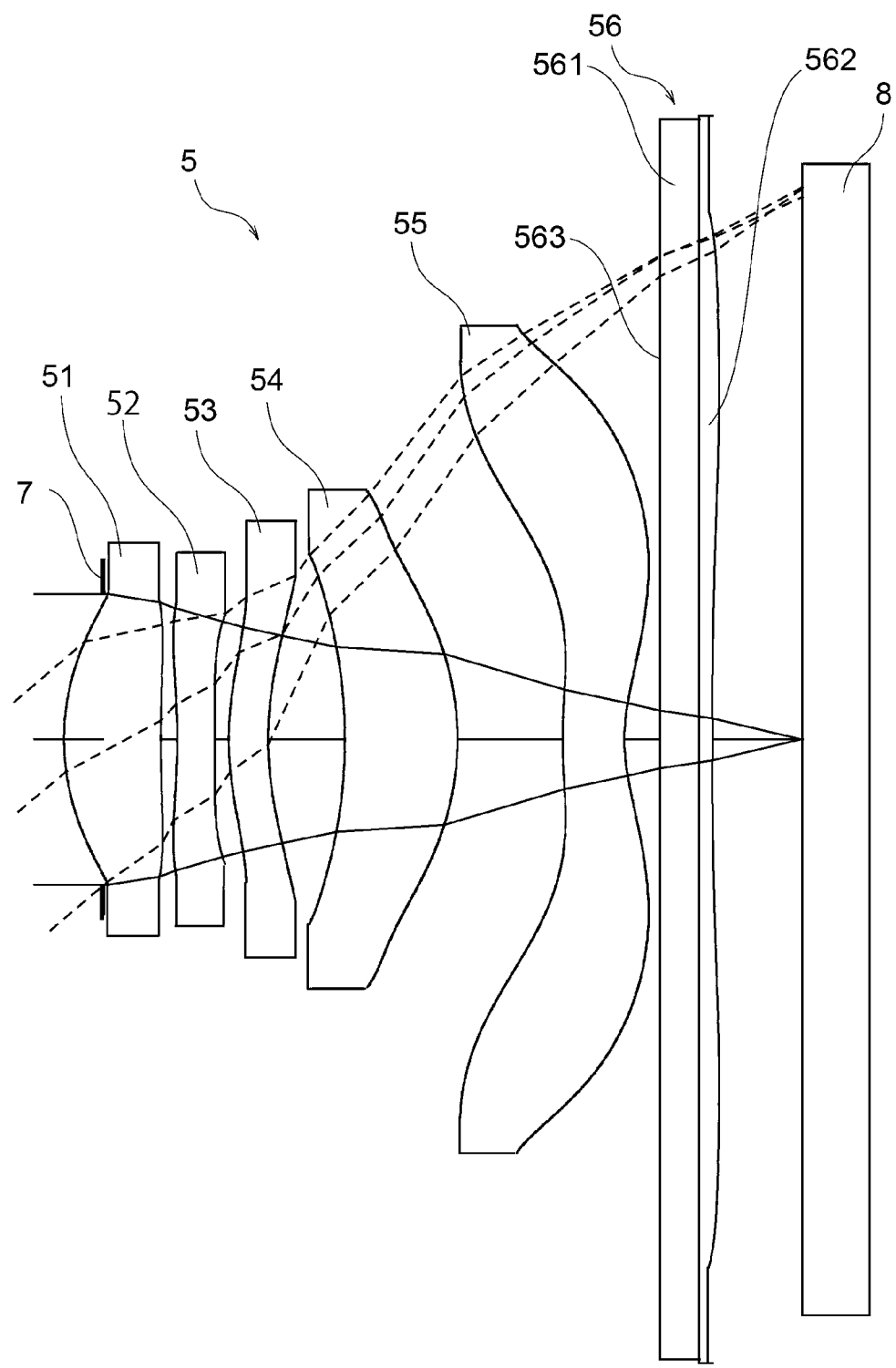
FIG. 9 is a schematic diagram of an imaging optical system according to a fifth embodiment.

FIG. 9 is a schematic diagram of an imaging optical 5 according to a fifth embodiment.

The imaging lens 5 according to the fifth embodiment includes, in order from the object side to the image side: a first lens 51 having a positive refractive power; a second lens 52 having a negative refractive power; a third lens 53 having a positive refractive power; a fourth lens 54 having a positive refractive power, a fifth lens 55 having a negative refractive power at the center of the lens and having an inflection point outside the optical axis, and a sixth lens 56 having a positive refractive power and having an inflection point outside the optical axis.

At the object side, the first lens 51 is provided with an aperture 7 with a fixed opening, and an imaging surface of an imaging element (image sensor) 8 is arranged at the imaging surface of the imaging lens 5.

The sixth lens 56 in the fifth embodiment is a compound lens consist of a glass substrate 561 made of blue glass and a lens portion 562 made of ultraviolet curable resin. In addition, an infrared-cut filter film 563 is formed on the front surface of the glass substrate 561 via vacuum deposition.

The data of lenses of the imaging lens 5 according to the fifth embodiment are shown in TABLE 17.

In the imaging lens 5, the thirteen surfaces (from the second surface to the fourteenth lens) of lenses from the first lens 51 to the lens portion 562 of the sixth lens 56 are aspherical surfaces, except for two surfaces (the twelfth surface and the thirteenth lens) of the substrate 561.

The aspheric coefficients and conic constant k of the aspherical surfaces according to the fifth embodiment are shown in TABLE 18 and TABLE 19.

TABLE 17

| optical element | Sn | R | D | nd | νd |
|---|---|---|---|---|---|
| aperture | 1 | ∞ | −0.213 | 1.00000 | 0.0 |
| L1 | 2 | 1.260 | 0.517 | 1.54392 | 55.9 |
|  | 3 | 8.409 | 0.086 | 1.00000 | 0.0 |
| L2 | 4 | −3.343 | 0.200 | 1.66120 | 20.3 |
|  | 5 | −251.630 | 0.075 | 1.00000 | 0.0 |
| L3 | 6 | 1.543 | 0.210 | 1.61500 | 25.9 |
|  | 7 | 1.719 | 0.409 | 1.00000 | 0.0 |
| L4 | 8 | −2.821 | 0.601 | 1.54392 | 55.9 |
|  | 9 | −1.558 | 0.560 | 1.00000 | 0.0 |
| L5 | 10 | 2.387 | 0.330 | 1.53463 | 56.3 |
|  | 11 | 0.956 | 0.190 | 1.00000 | 0.0 |
| L6(substrate) | 12 | ∞ | 0.210 | 1.51680 | 64.2 |
| L6(lens) | 13 | ∞ | 0.070 | 1.60176 | 30.7 |
|  | 14 | −11.972 | 0.481 | 1.00000 | 0.0 |

TABLE 18

| Sn | K | A3 | A4 | A5 | A6 |
|---|---|---|---|---|---|
| 2 | 0.0000E+00 | 8.4746E−03 | −2.0330E−01 | 1.5375E+00 | −6.8302E+00 |
| 3 | 0.0000E+00 | 3.5044E−02 | −4.6164E−01 | 2.6396E+00 | −1.0220E+01 |
| 4 | 0.0000E+00 | 3.4100E−02 | 1.8977E−02 | 1.8417E+00 | −6.6189E+00 |
| 5 | 0.0000E+00 | 2.4025E−02 | −1.3538E−01 | 1.9433E+00 | −6.6895E+00 |
| 6 | 0.0000E+00 | −2.2701E−02 | −1.1112E−01 | −2.0465E+00 | 8.3744E+00 |
| 7 | 0.0000E+00 | 1.8745E−02 | −4.6789E−01 | 1.5870E+00 | −2.3549E+00 |
| 8 | 0.0000E+00 | −3.3078E−03 | −1.1271E−01 | 1.1595E+00 | −7.3898E+00 |
| 9 | 0.0000E+00 | −4.7846E−02 | 4.3506E−02 | −2.9213E−01 | 2.4791E+00 |
| 10 | 0.0000E+00 | 2.5657E−01 | −2.5960E+00 | 4.7993E+00 | −5.1648E+00 |
| 11 | −1.2305E+01 | 7.1156E−02 | −1.3016E−01 | −7.5693E−01 | 1.8017E+00 |
| 14 | 0.0000E+00 | 1.5563E−01 | −9.4699E−02 | −1.6746E−01 | 3.3393E−01 |

TABLE 19

| Sn | A7 | A8 | A9 | A10 | A11 | A12 |
|---|---|---|---|---|---|---|
| 2 | 1.7596E+01 | −2.6738E+01 | 2.2068E+01 | −7.8312E+00 | 0.0000E+00 | 0.0000E+00 |
| 3 | 2.2845E+01 | −3.0444E+01 | 2.2175E+01 | −6.8895E+00 | 0.0000E+00 | 0.0000E+00 |
| 4 | 1.1921E+01 | −1.1131E+01 | 4.6881E+00 | −4.1317E−01 | 0.0000E+00 | 0.0000E+00 |
| 5 | 1.6218E+01 | −2.4689E+01 | 2.1898E+01 | −8.3622E+00 | 0.0000E+00 | 0.0000E+00 |
| 6 | −1.7165E+01 | 1.2745E+01 | 2.3712E+01 | −7.2325E+01 | 7.5203E+01 | −2.9392E+01 |
| 7 | −8.8945E+00 | 4.8039E+01 | −9.9959E+01 | 1.1115E+02 | −6.4731E+01 | 1.5459E+01 |
| 8 | 2.7121E+01 | −6.0811E+01 | 8.5242E+01 | −7.3255E+01 | 3.5675E+01 | −7.6438E+00 |
| 9 | −9.7081E+00 | 2.1833E+01 | −2.9438E+01 | 2.3507E+01 | −1.0156E+01 | 1.8140E+00 |
| 10 | 3.4632E+00 | −1.3664E+00 | 2.8450E−01 | −2.3766E−02 | 0.0000E+00 | 0.0000E+00 |
| 11 | −1.8346E+00 | 1.0069E+00 | −2.9062E−01 | 3.4566E−02 | 0.0000E+00 | 0.0000E+00 |
| 14 | −2.5174E−01 | 9.7286E−02 | −1.9037E−03 | 1.4889E−03 | 1.9654E−07 | 7.9518E−08 |

TABLE 20 shows the focal length f of the overall system, the F-value, the full field angle, the maximal image height, total track length (TTL), the combined focal length f12345 of the lenses from the first lens 51 to the fifth lens 55, and the focal length f6 of the sixth lens 56 according to the illustrated embodiment.

TABLE 20

| | |
|---|---|
| f(mm) | 3.49 |
| F-value | 2.26 |
| full field angle(°) | 80.5 |
| maximal image height(mm) | 2.934 |
| TTL(mm) | 3.939 |
| f12345(mm) | 3.58 |
| f6(mm) | 19.90 |

According to TABLE 20, in the fifth embodiment, TTL/2ih=0.671, therefore the aforementioned condition (1) is satisfied; additionally, ih/f=0.842, therefore the aforementioned condition (2) is satisfied; furthermore, f/f12345=0.973, therefore the aforementioned condition (3) is satisfied; and f/f6=0.175, thus the aforementioned condition (4) is satisfied.

Figure 10:
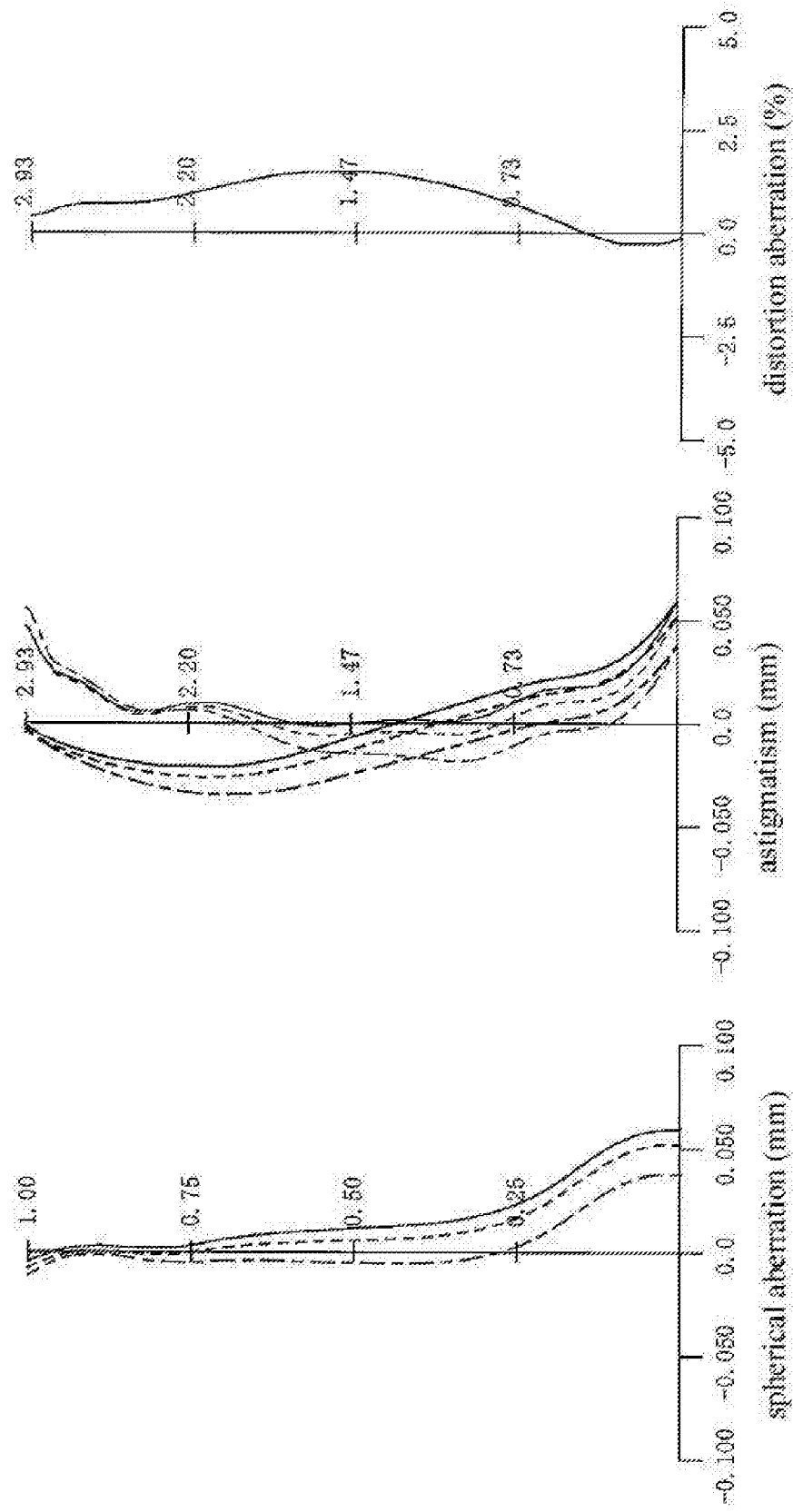
FIG. 10 is a diagram of aberrations of the fifth embodiment in an infinity in-focus state.

FIG. 10 is a diagram of aberrations of the fifth embodiment in an infinity in-focus state.

FIG. 10 shows the diagram of the spherical aberration, the astigmatism, and the distortion aberration.

In the diagram of and the spherical aberration and the astigmatism, the dash line represents the value of d-line (wavelength 587.6 nm), the dash and dot line represents the value of g-line (wavelength 435.8 nm), and the solid line represents the value of c-line (wavelength 656.3 nm). In addition, in the diagram of the astigmatism, the bold line represents the value of the sagittal image surface, and the thin line represents the value of the tangential image surface.

Furthermore, in the diagram of the distortion aberration, since the shapes of the d-line, g-line, and the c-line are substantially identical, the d-line is illustrated as a representative.

According to the diagrams of the aberrations, the aberrations in the fifth embodiment are sufficiently corrected, and the imaging performance is improved.

The Sixth Embodiment

Figure 11:
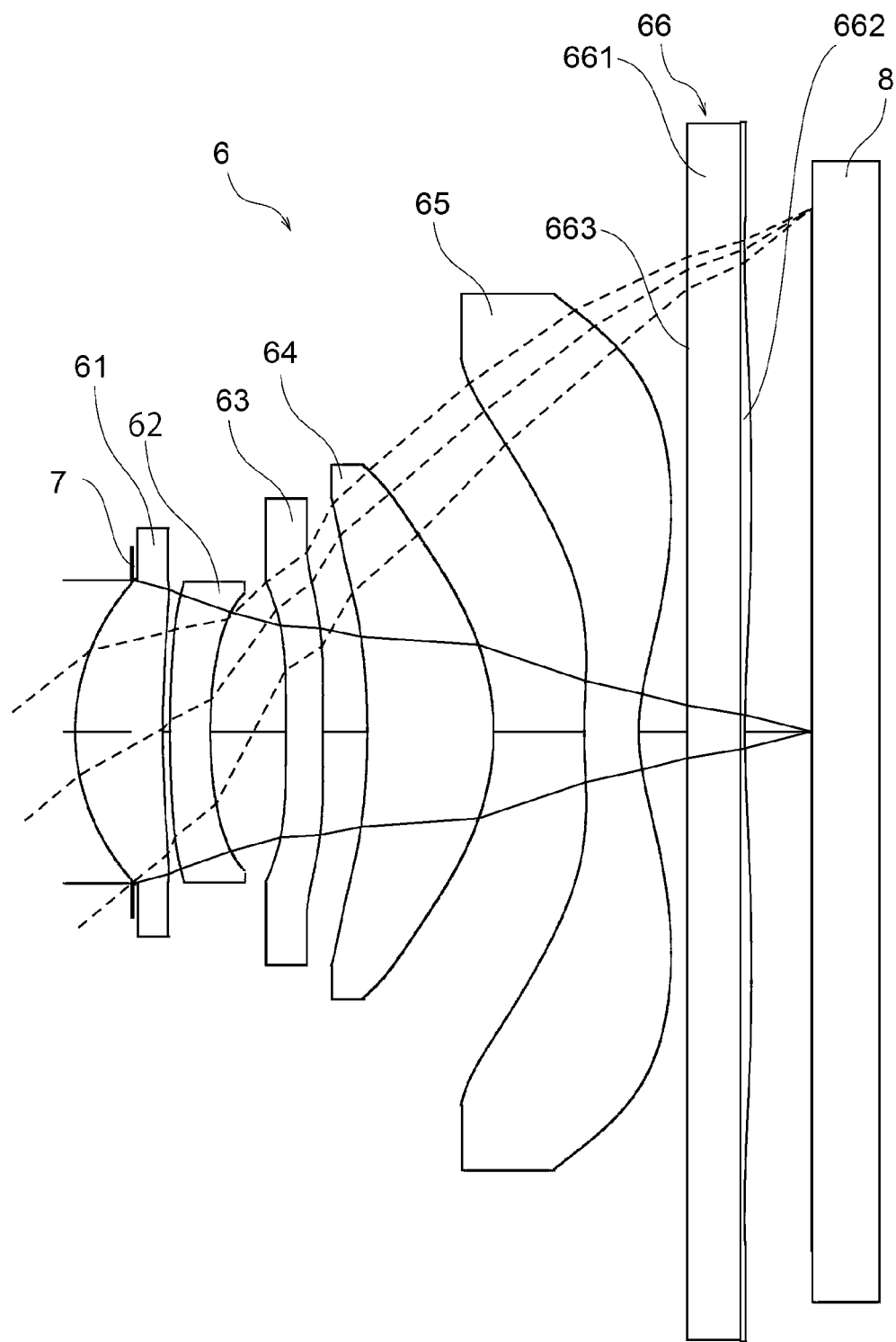
FIG. 11 is a schematic diagram of an imaging optical system according to a sixth embodiment.

FIG. 11 is a schematic diagram of an imaging optical 6 according to a sixth embodiment.

The imaging lens 6 according to the sixth embodiment includes, in order from the object side to the image side: a first lens 61 having a positive refractive power; a second lens 62 having a negative refractive power; a third lens 63 having a negative refractive power; a fourth lens 64 having a positive refractive power, a fifth lens 65 having a negative refractive power at the center of the lens and having an inflection point outside the optical axis, and a sixth lens 66 having a negative refractive power and having an inflection point outside the optical axis.

At the object side, the first lens 61 is provided with an aperture 7 with a fixed opening, and an imaging surface of an imaging element (image sensor) 8 is arranged at the imaging surface of the imaging lens 6.

The sixth lens 6 in the sixth embodiment is a compound lens consist of a glass substrate 661 made of white glass and a lens portion 662 made of ultraviolet curable resin. In addition, an infrared-cut filter film 663 is formed on the front surface of the glass substrate 661 via vacuum deposition.

The data of lenses of the imaging lens 6 according to the sixth embodiment are shown in TABLE 21.

TABLE 21

| optical element | Sn | R | D | nd | vd |
|---|---|---|---|---|---|
| aperture | 1 | ∞ | −0.318 | 1.00000 | 0.0 |
| L1 | 2 | 1.252 | 0.493 | 1.54392 | 55.9 |
|  | 3 | 7.131 | 0.040 | 1.00000 | 0.0 |
| L2 | 4 | 7.330 | 0.226 | 1.66120 | 20.3 |
|  | 5 | 2.675 | 0.424 | 1.00000 | 0.0 |
| L3 | 6 | −3754.284 | 0.206 | 1.66120 | 20.3 |
|  | 7 | 21.294 | 0.250 | 1.00000 | 0.0 |
| L4 | 8 | −4.924 | 0.710 | 1.54392 | 55.9 |
|  | 9 | −1.442 | 0.509 | 1.00000 | 0.0 |
| L5 | 10 | 3.704 | 0.305 | 1.53463 | 56.3 |
|  | 11 | 1.143 | 0.270 | 1.00000 | 0.0 |
| L6(substrate) | 12 | ∞ | 0.300 | 1.51680 | 64.2 |
| L6(lens) | 13 | ∞ | 0.027 | 1.56437 | 37.9 |
|  | 14 | 10.911 | 0.371 | 1.00000 | 0.0 |

In the imaging lens 6, the thirteen surfaces (from the second surface to the fourteenth lens) of lenses from the first lens 61 to the lens portion 662 of the sixth lens 66 are aspherical surfaces, except for two surfaces (the twelfth surface and the thirteenth lens) of the substrate 661.

The aspheric coefficients and conic constant k of the aspherical surfaces according to the sixth embodiment are shown in TABLE 22 and TABLE 23.

TABLE 22

| Sn | K | A3 | A4 | A5 | A6 |
|---|---|---|---|---|---|
| 2 | 0.0000E+00 | −4.7072E−02 | 4.8991E−01 | −2.7471E+00 | 9.0551E+00 |
| 3 | 0.0000E+00 | −1.5103E−02 | 1.2960E−01 | −9.8337E−01 | 3.4606E+00 |
| 4 | 0.0000E+00 | 2.7884E−02 | −2.6193E−01 | 1.1315E+00 | −2.5865E+00 |
| 5 | 0.0000E+00 | −1.0513E−03 | −5.0529E−02 | 1.0052E+00 | −2.6420E+00 |
| 6 | 0.0000E+00 | 3.1160E−02 | −5.8586E−01 | 2.3511E+00 | −1.1369E+01 |
| 7 | 0.0000E+00 | 2.4537E−04 | −1.7173E−01 | −4.3723E−01 | 3.0091E+00 |
| 8 | 0.0000E+00 | −6.6975E−02 | 1.2203E−01 | 1.3878E+00 | −1.1929E+01 |
| 9 | −6.4745E−01 | −4.9895E−02 | 1.9546E−01 | −5.1523E−01 | 6.8840E−01 |
| 10 | 0.0000E+00 | 1.6969E−01 | −1.5949E+00 | 2.5187E+00 | −1.9004E+00 |
| 11 | −1.2890E+01 | 3.6025E−02 | 3.5053E−01 | −1.8631E+00 | 3.4178E+00 |
| 14 | 0.0000E+00 | 1.1135E−01 | −3.0670E−01 | 3.6910E−01 | −3.7081E−01 |

TABLE 23

| Sn | A7 | A8 | A9 | A10 | A11 | A12 |
|---|---|---|---|---|---|---|
| 2 | −1.5731E+01 | 6.0858E+00 | 2.9450E+01 | −6.0100E+01 | 4.8391E+01 | −1.4964E+01 |
| 3 | −7.0678E+00 | 8.2828E+00 | −4.3641E+00 | 2.6828E−01 | −2.7323E−01 | 4.5266E−01 |
| 4 | 1.5070E+00 | 1.0386E+01 | −3.3641E+01 | 4.9090E+01 | −3.7281E+01 | 1.1733E+01 |
| 5 | −4.0673E+00 | 4.7161E+01 | −1.3513E+02 | 1.9673E+02 | −1.4896E+02 | 4.6960E+01 |
| 6 | 3.8389E+01 | −8.8930E+01 | 1.3665E+02 | −1.3296E+02 | 7.4710E+01 | −1.8535E+01 |
| 7 | −1.1739E+01 | 2.8366E+01 | −4.3179E+01 | 4.0193E+01 | −2.0405E+01 | 4.2540E+00 |
| 8 | 4.1118E+01 | −7.9662E+01 | 9.2293E+01 | −6.3004E+01 | 2.3321E+01 | −3.6087E+00 |
| 9 | 3.4254E−02 | −1.0415E+00 | 8.1371E−01 | 1.5493E−01 | −3.7636E−01 | 1.0660E−01 |
| 10 | −1.9568E−02 | 1.4805E+00 | −1.3747E+00 | 5.8833E−01 | −1.2322E−01 | 1.0052E−02 |
| 11 | −3.5571E+00 | 2.3475E+00 | −1.0037E+00 | 2.7051E−01 | −4.2114E−02 | 2.9221E−03 |
| 14 | 3.1171E−01 | −1.7825E−01 | 6.0576E−02 | −1.0705E−02 | 6.6431E−04 | 2.2541E−05 |

TABLE 24 shows the focal length f of the overall system, the F-value, the full field angle, the maximal image height, total track length (TTL), the combined focal length f12345 of the lenses from the first lens 61 to the fifth lens 65, and the focal length f6 of the sixth lens 66 according to the illustrated embodiment.

TABLE 24

| | |
|---|---|
| f(mm) | 3.51 |
| F-value | 2.06 |
| full field angle(°) | 79.4 |
| maximal image height(mm) | 2.934 |
| TTL(mm) | 4.131 |
| f12345(mm) | 3.45 |
| f6(mm) | −19.33 |

According to TABLE 24, in the sixth embodiment, TTL/2ih=0.704, therefore the aforementioned condition (1) is satisfied; additionally, ih/f=0.835, therefore the aforementioned condition (2) is satisfied; furthermore, f/f12345=1.020, therefore the aforementioned condition (3) is satisfied; and f/f6=−0.182, thus the aforementioned condition (4) is satisfied.

Figure 12:
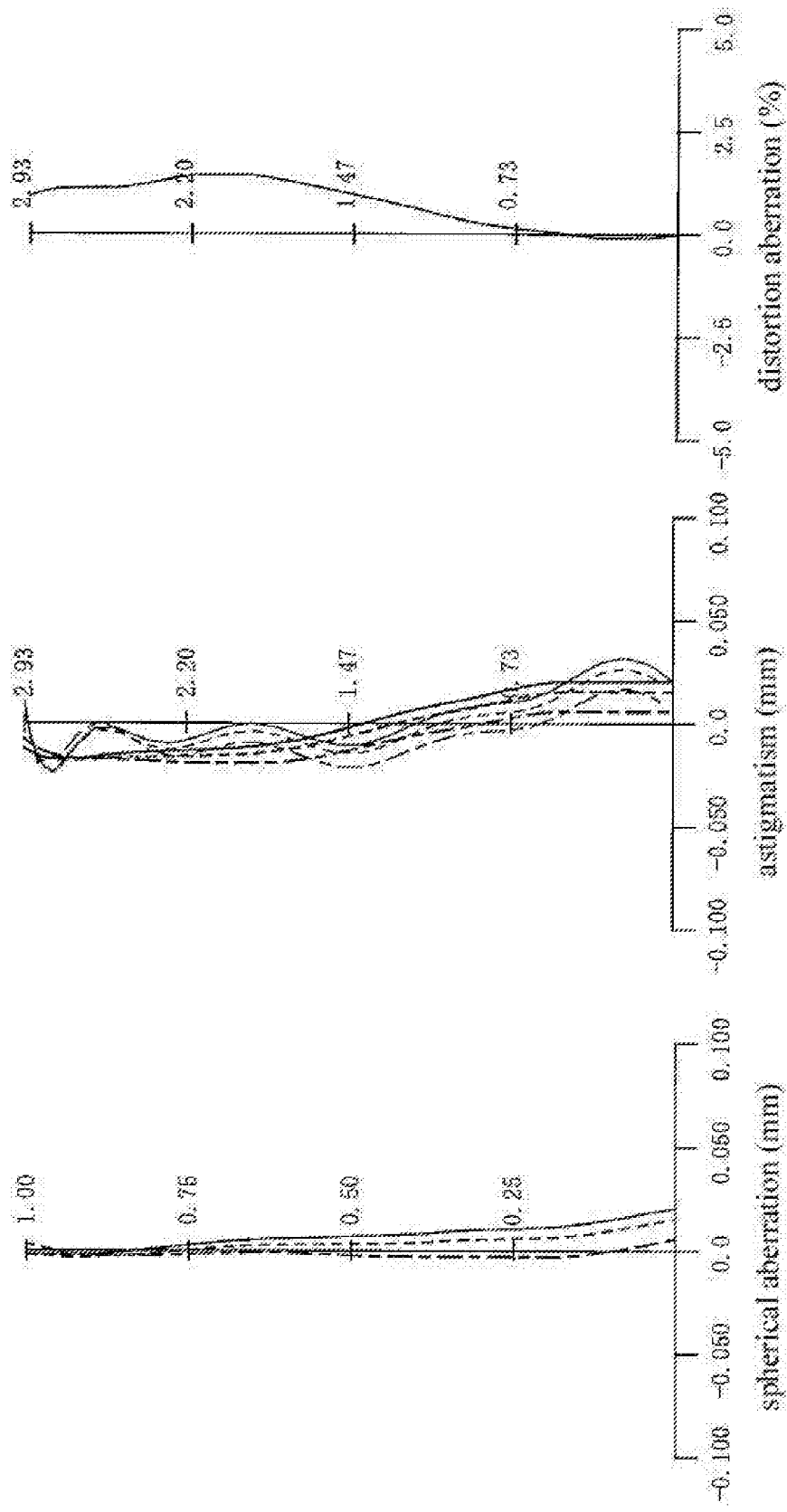
FIG. 12 is a diagram of aberrations of the sixth embodiment in an infinity in-focus state.

FIG. 12 is a diagram of aberrations of the sixth embodiment in an infinity in-focus state.

FIG. 12 shows the diagram of the spherical aberration, the astigmatism, and the distortion aberration.

In the diagram of and the spherical aberration and the astigmatism, the dash line represents the value of d-line (wavelength 587.6 nm), the dash and dot line represents the value of g-line (wavelength 435.8 nm), and the solid line represents the value of c-line (wavelength 656.3 nm). In addition, in the diagram of the astigmatism, the bold line represents the value of the sagittal image surface, and the thin line represents the value of the tangential image surface.

Furthermore, in the diagram of the distortion aberration, since the shapes of the d-line, g-line, and the c-line are substantially identical, the d-line is illustrated as a representative.

According to the diagrams of the aberrations, the aberrations in the sixth embodiments are sufficiently corrected, and the imaging performance is improved.

Structure of the Imaging Apparatus

An imaging apparatus according to an embodiment includes: an imaging lens; and an imaging element configured to convert an optical image obtained from the imaging lens to an electric signal. The imaging lens includes, in order from an object side toward an image side: a first lens having a convex surface facing the object side, and the first lens having a positive refractive power; a second lens being a meniscus lens having a negative refractive power; a third lens having a concave surface facing the imaging side, and two surfaces thereof being aspherical; a fourth lens being a meniscus lens having a positive refractive power, the fourth lens having a convex surface facing the image side; a fifth lens with a negative refractive power, the fifth lens having a concave surface facing the image side on an optical axis, the surface facing the image surface having an inflection point outside the optical axis, and two surfaces thereof being aspherical; a sixth lens having a rear surface facing the image side and a front surface facing the object side, the rear surface being aspherical with a inflection point outside an optical axis, the front surface having a curvature less than any curvatures of the other lenses, and the sixth lens serving as an infrared cut-off filter.

In other words, the imaging lens of the imaging apparatus according to an embodiment has a structure composed of six lenses of positive, negative, positive/negative, positive, negative, positive/negative. The second lens and the fourth lens are meniscus lenses, the third lens and the fifth lens are lenses with two aspherical surfaces, and the fifth lens and the sixth lens are aspherical lenses with inflection points.

Additionally, the sixth lens of the imaging apparatus according present disclosure also serves as the infrared cut-off filter. A conventional imaging apparatus is equipped with an infrared cut-off filter between an imaging lens and an image surface. Therefore, the conventional imaging lens requires a long focal length, which prevents the imaging lens from being thinner. On the contrary, the imaging lens according to an embodiment is designed with a shorter back focal length, therefore the thickness is reduced.

Additionally, the light transmittance of the sixth length is a half (50%) for any wavelength from 380 nm to 430 nm, the light transmittance for wavelength from 500 nm to 600 nm is 80% or more, and the light transmittance for wavelength from 730 nm to 800 nm is 10% or less.

Additionally, the curvature of the front surface of the sixth lens is less than any curvatures of the other lenses. Typically, the front surface can have a shape of plane. When the front surface of the sixth lens has a low curvature, the task of correcting residual image surface curvature and the distortion aberration from the first lens to the fifth lens, and the task of correcting a chief ray angle (CRA) of sensor can be completed on the rear surface of the sixth lens, which is the last surface of the imaging lens.

When a distance between a correcting surface configured to correct the image surface curvature and the distortion aberration and the image surface is relatively long, (for example, assuming the correcting surface is the front surface of the sixth length and the rear surface is a surface with low curvature), an area of light transmitting the correcting surface becomes larger. In this case, the correcting surface of the sixth lens has an increased correction effect on the image surface curvature and the distortion aberration. Additionally, in order to avoid the generation of the coma aberration, the tolerance of the shape accuracy to be attained by the aspherical shape of the correcting surface becomes very strict. However, as previously described, the imaging lens according to an embodiment can be designed with a shorter back focal length, therefore the tolerance of the shape accuracy can be loosen via using the sixth lens to correct the image surface curvature and the distortion aberration.

Additionally, to correct CRA, an angle of the light from a rear surface of the fifth lens is corrected at the correcting surface. When the distance between the correcting surface and the image surface is relatively long, (for example, assuming the correcting surface is the front surface of the sixth length and the rear surface is a surface with low curvature), a larger and positive amount of distortion aberration is required to be generated on the first lens to the fifth lens. Therefore, the aspherical amount of the first lens to the fifth lens, especially of the aspherical surfaces facing the object side increases exponentially, which makes it difficult to manufacture the first lens to fifth lens. However, as previously described, the imaging lens according to an embodiment can be designed with a shorter back focal length, therefore the correction of CRA can be achieved.

Furthermore, the function of the sixth lens serving as the infrared cut-off filter can be achieved by a filter layer provided by vapor deposition or dye spin coating of a metal multilayer film. In order to make the layer uniform, the filter layer is provided on a surface with a low curvature. When the filter layer is provided on the surface with a low curvature, it is still impossible to avoid a nonuniform caused by paint detachment, incomplete coating or smear (partial overcoating), and the like. Assuming that the front surface of the sixth lens is an aberration correcting surface with an aspherical shape, the rear surface of the sixth lens is a surface with low curvature functioning as the infrared cut-off filter, then the distance between the filter layer and the image surface is shorter. Therefore, a ratio of "defect area/beam passing area" which is an evaluation index of defects such as black spots becomes longer, and which is not realistic as a manufacturing specification. However, as aforementioned, since the imaging lens according to an embodiment has the sixth lens having a front surface with low curvature, and the rear surface as a correcting surface, then the distance between the filter layer and the image surface is longer, the ratio of "defect area/beam passing area" is less.

Additionally, the imaging lens of the imaging apparatus according to an embodiment of the present disclosure satisfies the following conditions (1) and (2):

$$TTL/2ih < 0.8 \quad (1)$$

$$0.75 < ih/f < 0.9 \quad (2)$$

TTL is a distance on the optical axis from the surface of the first lens facing the object side toward an image surface, $ih$ is a maximal image height, and $f$ is a focal length of the overall imaging lens system.

The condition (1) determines a ratio of a distance on the optical axis from the surface facing the object side to the image surface over the maximal image height. In an imaging lens, the distance on the optical axis from the surface facing the object side of the first lens to the image surface is generally refereed as a total track length (TTL).

When the imaging lens doesn't satisfy the condition (1), either the maximal image height is too small, or TTL is too long. When the maximal image height is too small, the field angle of the imaging lens is inadequate, the function of being a wide angle lens is impaired. Otherwise, when TTL is too long, the imaging lens cannot meet the requirement of reduced thickness.

The condition (2) determines a ratio of the maximal image height over a focal length of the overall imaging lens system (hereinafter referred as "overall system focal length").

When the value of the imaging lens is lower than the lower limit of condition (2), either the overall system focal length is too long, or the maximal image height is too small. When the overall system focal length is too long, the field angle can be inadequate or TTL can be too long, thus the imaging lens doesn't have enough large caliber and slight thickness. Additionally, when the maximal image height is too small, as aforementioned, the imaging lens doesn't have enough large caliber.

Otherwise, when the value of the imaging lens is higher than the higher limit of the condition (2), either the overall system focal length is too short, or the maximal image height is too large, thus the imaging lens may not achieve the high performance in aberration and imaging performance.

Therefore, via satisfying the conditions (1) and (2), an imaging apparatus with reduced thickness and large caliber, and a high performance in aberration and imaging performance can be provided.

Figure 13:
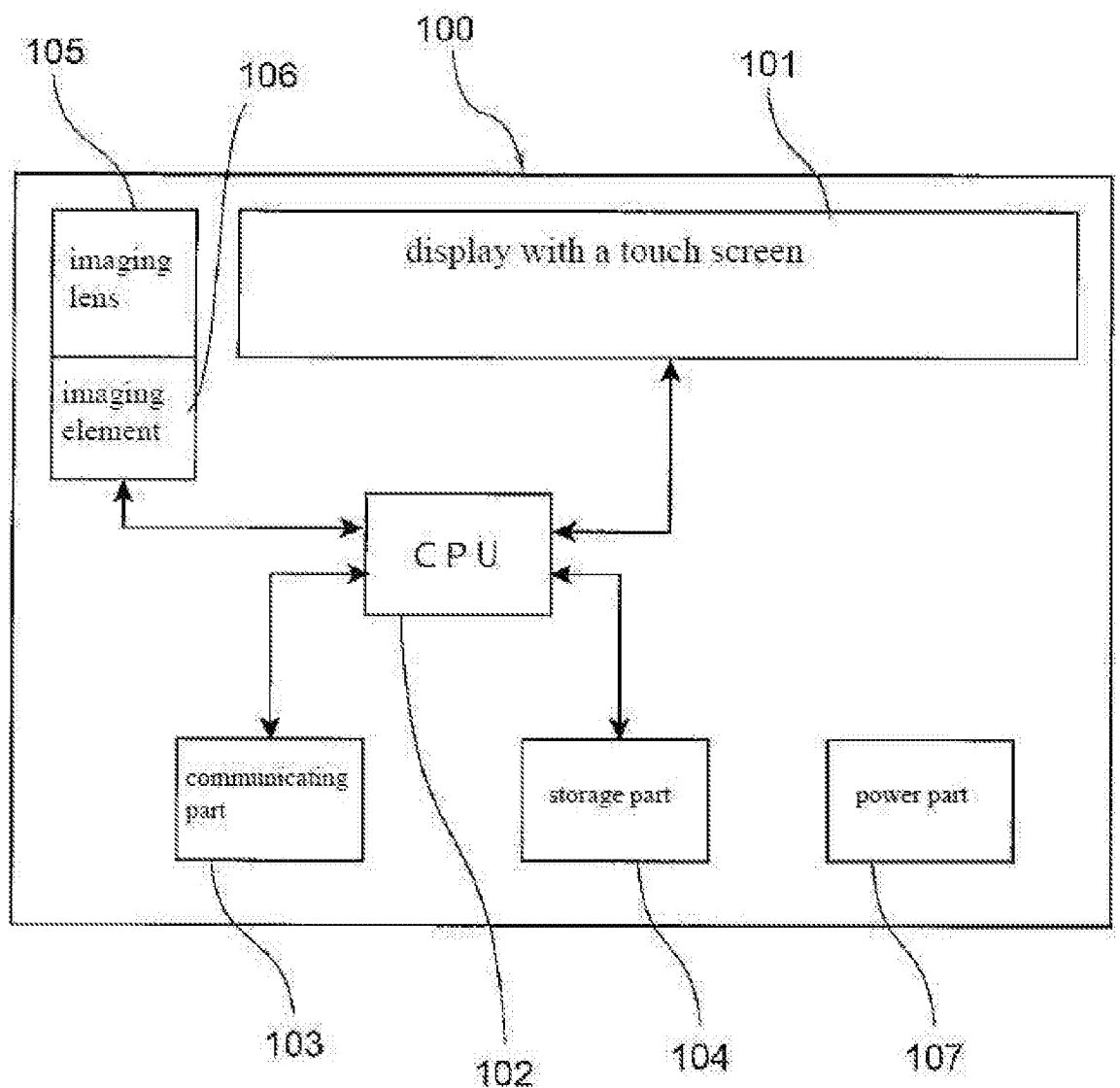
FIG. 13 is a block diagram of a smartphone having an imaging apparatus according to an embodiment.

FIG. 13 is a block diagram of a smartphone having an imaging apparatus according to an embodiment.

A smartphone 100 includes: a display 101 with a touch screen, which is configured to function as a display part and an input part; a CPU (central processing unit) 102, which performs the input and output of information, the processing of information, and the control processing via the display 101 with the touch screen; a communicating part 103, which performs the telephone communication and the Wi-Fi communication according the control of the CPU 102; a storage part 104 to store various information; imaging lens 105, which uses imaging lenses according to aforementioned embodiments; imaging element (image sensor) 106 configured to convert the optical image from the imaging lens 105 to electrical signal; and a power port 107 configured to supply electric power to each components of the smartphone 100.

The electrical signal obtained from converting the optical image via the imaging element 106 is read by CPU 102 as the image data and is processed with various types of signal processing or image processing. Additionally, the image data is shown on the display with the touch screen, is stored in the storage part 104, or is sent via the communicating part 103 according to the user's instruction via the display 101 with the touch screen.

In addition, in the aforementioned specification, a smartphone is illustrated as an embodiment of the imaging apparatus according to an embodiment. However, the imaging apparatus according to an embodiment can be a mobile phone other than smartphone, a mobile terminal such as a tablet or a laptop, or a digital camera.

What is claimed is:

1. An imaging lens, comprising, in order from an object side toward an image side:
   a first lens having a convex surface facing the object side, and the first lens having a positive refractive power;
   a second lens being a meniscus lens having a negative refractive power;
   a third lens having a concave surface facing the imaging side, and two surfaces thereof being aspherical;
   a fourth lens being a meniscus lens having a positive refractive power, the fourth lens having a convex surface facing the image side;

a fifth lens having a negative refractive power, the fifth lens having a concave surface facing the image side on an optical axis, the surface facing the image side having an inflection point outside the optical axis, and two surfaces thereof being aspherical; and a sixth lens having a rear surface facing the image side and a front surface facing the object side, the rear surface being aspherical with a inflection point outside an optical axis, the front surface having a curvature less than any curvatures of the other lenses, and the sixth lens serving as an infrared cut-off filter;

wherein the imaging lens satisfies the following conditions (1) and (2):

$$TTL/2ih<0.8 \quad (1)$$

$$0.75<ih/f<0.9 \quad (2)$$

wherein TTL is a distance on the optical axis from the surface of the first lens facing the object side toward an image surface, ih is a maximal image height, and f is a focal length of an overall imaging lens system; and wherein the sixth lens serves as the infrared cut-off filter due to a material of the lens.

2. An imaging lens, comprising, in order from an object side toward an image side:

a first lens having a convex surface facing the object side, and the first lens having a positive refractive power;

a second lens being a meniscus lens having a negative refractive power;

a third lens having a concave surface facing the imaging side, and two surfaces thereof being aspherical;

a fourth lens being a meniscus lens having a positive refractive power, the fourth lens having a convex surface facing the image side;

a fifth lens having a negative refractive power, the fifth lens having a concave surface facing the image side on an optical axis, the surface facing the image side having an inflection point outside the optical axis, and two surfaces thereof being aspherical; and a sixth lens having a rear surface facing the image side and a front surface facing the object side, the rear surface being aspherical with a inflection point outside an optical axis, the front surface having a curvature less than any curvatures of the other lenses, and the sixth lens serving as an infrared cut-off filter;

wherein the imaging lens satisfies the following conditions (1) and (2):

$$TTL/2ih<0.8 \quad (1)$$

$$0.75<ih/f<0.9 \quad (2)$$

wherein TTL is a distance on the optical axis from the surface of the first lens facing the object side toward an image surface, ih is a maximal image height, and f is a focal length of an overall imaging lens system; and wherein the sixth lens is provided with an infrared cut-off layer on the front surface.

3. The imaging lens according to claim 1, wherein the sixth lens is a compound lens constituted by a substrate portion located on the object side and an aspherical lens located on the image side.

4. The imaging lens according to claim 1, wherein the imaging lens satisfies the following conditions (3) and (4):

$$0.9<f/f12345<1.1 \quad (3)$$

$$-0.5\leq f/f6\leq 0.3 \quad (4)$$

wherein f is the focal length of the overall imaging lens system, f12345 is a combined focal length of the first lens, the second lens, the third lens, the fourth lens, and the fifth lens, and f6 is a focal length of the sixth length.

5. An imaging apparatus, comprising:

an imaging lens; and an imaging element configured to convert an optical image obtained from the imaging lens to an electric signal;

wherein the imaging lens comprises, in order from an object side toward an image side:

a first lens having a convex surface facing the object side, and the first lens having a positive refractive power;

a second lens being a meniscus lens having a negative refractive power;

a third lens having a concave surface facing the imaging side, and two surfaces thereof being aspherical;

a fourth lens being a meniscus lens having a positive refractive power, the fourth lens having a convex surface facing the image side;

a fifth lens having a negative refractive power, the fifth lens having a concave surface facing the image side on an optical axis, the surface facing the image side having an inflection point outside the optical axis, and two surfaces thereof being aspherical; and a sixth lens having a rear surface facing the image side and a front side facing the object side, the rear surface being aspherical with a inflection point outside an optical axis, the front surface having a curvature less than any curvatures of the other lenses, and the sixth lens serving as an infrared cut-off filter;

wherein the imaging lens satisfies the following conditions (1) and (2):

$$TTL/2ih<0.8 \quad (1)$$

$$0.75<ih/f<0.9 \quad (2)$$

wherein TTL is a distance on the optical axis from the surface of the first lens facing the object side toward an image surface, ih is a maximal image height, and f is a focal length of an overall imaging lens system, and wherein the sixth lens serves as the infrared cut-off filter due to a material of the lens.

6. The imaging apparatus according to claim 5, wherein the sixth lens is a compound lens constituted by a substrate portion located on the object side and an aspherical lens located on the image side.

7. The imaging apparatus according to claim 5, wherein the imaging lens satisfies the following conditions (3) and (4):

$$0.9<f/f12345<1.1 \quad (3)$$

$$-0.5\leq f/f6\leq 0.3 \quad (4)$$

wherein f is the focal length of the overall imaging lens system, f12345 is a combined focal length of the first lens, the second lens, the third lens, the fourth lens, and the fifth lens, and f6 is a focal length of the sixth length.

* * * * *